United States Patent
Gao et al.

(10) Patent No.: US 12,538,276 B2
(45) Date of Patent: Jan. 27, 2026

(54) DATA TRANSMISSION METHOD AND APPARATUS

(71) Applicant: Huawei Technologies Co., Ltd., Shenzhen (CN)

(72) Inventors: Lei Gao, Beijing (CN); Xingqing Cheng, Beijing (CN); Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 419 days.

(21) Appl. No.: 18/154,515

(22) Filed: Jan. 13, 2023

(65) Prior Publication Data

US 2023/0156676 A1    May 18, 2023

Related U.S. Application Data

(63) Continuation of application No. PCT/CN2021/104326, filed on Jul. 2, 2021.

(30) Foreign Application Priority Data

Jul. 15, 2020    (CN) .......................... 202010683210.0

(51) Int. Cl.
*H04W 72/0446*    (2023.01)
*H04L 5/00*    (2006.01)
(Continued)

(52) U.S. Cl.
CPC ....... *H04W 72/0446* (2013.01); *H04L 5/0051* (2013.01); *H04W 72/0453* (2013.01); *H04W 72/20* (2023.01)

(58) Field of Classification Search
CPC ... H04L 5/0051; H04L 5/0082; H04L 5/0048; H04L 5/0094; H04L 5/0023;
(Continued)

(56) References Cited

U.S. PATENT DOCUMENTS 12,273,913 B2 * 4/2025 Xiong ............... H04W 74/0866
2020/0229198 A1 * 7/2020 Kung .................... H04W 72/23
(Continued)

FOREIGN PATENT DOCUMENTS

| CN | 109413622 A | 3/2019 |
|---|---|---|
| CN | 109714735 A | 5/2019 |
| EP | 3664555 A1 | 6/2020 |

*Primary Examiner* — Brian D Nguyen
(74) *Attorney, Agent, or Firm* — Conley Rose, P.C.

(57) ABSTRACT

A data transmission method and apparatus that may be applied to short-range wireless communication, for example, a cockpit domain includes receiving at least one piece of first configuration information from a first node, where the at least one piece of first configuration information indicates at least one of a first time-domain resource or a first frequency domain resource, where the first time-domain resource or the first frequency domain resource is used to carry first data and a first reference signal, and where the first reference signal is a demodulation reference signal of the first data; and transmitting the first reference signal on a second time-frequency resource, where the second time-frequency resource does not overlap a third time-frequency resource.

20 Claims, 12 Drawing Sheets

(51) Int. Cl.
*H04W 72/0453* (2023.01)
*H04W 72/20* (2023.01)

(58) Field of Classification Search
CPC .................. H04L 5/0039; H04W 72/0453;
H04W 16/10; H04W 72/20; H04W
72/0446; H04W 72/044
See application file for complete search history.

(56) References Cited

U.S. PATENT DOCUMENTS

| | | | | |
|---|---|---|---|---|
| 2021/0337513 | A1* | 10/2021 | Wu | H04W 72/02 |
| 2022/0014332 | A1* | 1/2022 | Wang | H04L 5/0007 |
| 2022/0070846 | A1* | 3/2022 | Yang | H04L 5/0094 |
| 2022/0337462 | A1* | 10/2022 | Li | H04W 72/0453 |
| 2022/0376864 | A1* | 11/2022 | Zhao | H04L 5/0051 |
| 2022/0386156 | A1* | 12/2022 | Park | H04W 24/10 |
| 2022/0408429 | A1* | 12/2022 | Choi | H04B 7/022 |
| 2023/0121866 | A1* | 4/2023 | Wu | H04W 74/08 |
| | | | | 370/329 |
| 2023/0164847 | A1* | 5/2023 | Kim | H04W 74/0833 |
| | | | | 370/329 |

\* cited by examiner

DATA TRANSMISSION METHOD AND APPARATUS

CROSS-REFERENCE TO RELATED APPLICATIONS

This application is a continuation application of International Patent Application No. PCT/CN2021/104326, filed on Jul. 2, 2021, which claims priority to Chinese Patent Application No. 202010683210.0, filed on Jul. 15, 2020. The disclosures of the aforementioned applications are hereby incorporated by reference in their entireties.

TECHNICAL FIELD

This application relates to the field of communication technologies and, in particular, to short-range communication and, more specifically, to a data transmission method and apparatus in the field of communication technologies.

BACKGROUND

As global communication technologies develop, a development speed and applications of wireless communication technologies, with a development trend in full swing, have surpassed those of fixed communication technologies. Intelligent terminals such as an intelligent transport device, a smart home device and a robot gradually enter people's daily life.

The following uses the intelligent transport device, one of the intelligent terminals, as an example. Development and applications of an internet of vehicles technology attract more and more attention. Compared with the existing wired communication, vehicle-mounted wireless communication can further reduce a quantity, length, and weight of internal wiring harnesses in a vehicle, and corresponding installation and maintenance costs. Therefore, vehicle-mounted communication technologies gradually become wireless. Diversification of vehicle-mounted applications leads to an increasing quantity and more types of in-vehicle communication nodes, and imposes a higher requirement on a vehicle-mounted communication capability.

In a wireless communication scenario of the intelligent terminal, there is usually a plurality of communication domains in a specific communication area or range. The communication domain is a system including a group of communication nodes having communication relationships and communication connection relationships (namely, communication links) between the communication nodes. One communication domain includes one primary communication node (which may be referred to as a primary node) and at least one secondary communication node (which may be referred to as a secondary node). The primary node manages a time-frequency resource of the communication domain, and has a function of scheduling a resource for a communication link between the primary node and the secondary node. A node that does not belong to the communication domain (which may be referred to as an external node, including a device that has never joined in the communication domain and a device that has joined the communication domain and then exits the communication domain) may be converted into a secondary node of the communication domain through a process of joining in the communication domain. In the process of joining in the communication domain, the external node first needs to synchronize with the communication domain, and obtain system information such as resource configurations and supported features of the communication domain.

A short-range communication system related to the intelligent terminal may support data transmission of different service types such as an active noise canceling service and a video service. In a data transmission process in which there is a plurality of service types, how to improve flexibility and reliability of data transmission is a technical problem that needs to be urgently resolved.

SUMMARY

This application provides a data transmission method and apparatus, to improve data transmission flexibility and reliability.

According to a first aspect, an embodiment of this application provides a data transmission method, used for signal transmission between a secondary node and a primary node. The method is performed by the secondary node, or the method may be performed by a chip or an integrated circuit disposed on the secondary node. This is not limited in this application. The primary node manages the secondary node, has a function of allocating a resource, and is responsible for allocating a resource to the secondary node. The secondary node obeys scheduling of the primary node and uses the resource allocated by the primary node to communicate with the primary node. The secondary node is also referred to as a second node, and the primary node is also referred to as a first node.

The method includes receiving at least one piece of first configuration information from a first node, where the at least one piece of first configuration information indicates a first time-domain resource and/or a first frequency domain resource, the first time-domain resource and/or the first frequency domain resource are/is used to carry first data and a first reference signal, and the first reference signal is a demodulation reference signal of the first data; and transmitting the first reference signal on a second time-frequency resource, where the second time-frequency resource does not overlap a third time-frequency resource, the third time-frequency resource is used to carry second data and/or a control-type signal or control-type signaling, or the third time-frequency resource is not used to carry the first data and the first reference signal, and the first data is different from the second data.

Optionally, the method further includes determining the first time-domain resource and/or the first frequency domain resource, and/or generating the first reference signal, and/or generating the first data. This step may be performed by a processing unit or a processor.

According to the method, different types of data and/or reference signals can occupy different time-frequency resources, a resource conflict is avoided as much as possible, transmission and demodulation performance of different types of data is improved, and communication efficiency of a communication system is improved.

In a possible implementation, in a first frequency domain range, a time-domain start position of the second time-frequency resource is an earliest time subunit in time domain other than a first time-domain range in the first time-domain resource, or may be referred to as an earliest time subunit in a time-domain resource other than a first time-domain range in the first time-domain resource. In an example, in the first frequency domain range, a time-domain resource of the third time-frequency resource overlaps the first time-domain resource in the first time-domain range; or a time-domain start position of the second time-frequency resource is an earliest time subunit that may be used to carry the first reference signal in time domain in the first time-domain resource, or may be referred to as an earliest time subunit in a time-domain resource that is in the first time-domain resource and that may be used to carry the first reference signal.

In this manner, a transmission delay of the first reference signal can be reduced, data demodulation performance can be ensured as much as possible, and communication efficiency can be improved.

In a possible implementation, the time-domain start position of the second time-frequency resource in the first frequency domain range is different from the time-domain start position of the second time-frequency resource in the first frequency domain range.

In a possible implementation, in the first frequency domain range, a time-domain start position of a time-frequency resource used to carry the first data is not earlier than the time-domain start position of the second time-frequency resource, to improve demodulation efficiency of the first data. Alternatively, a time-domain start position of a time-frequency resource used to carry the first data may be earlier than a time-domain start position of the second time-frequency resource, so that transmission of the first reference signal is located in a same time subunit, to improve demodulation performance and reduce system design complexity.

In a possible implementation, the first frequency domain range includes N consecutive frequency units in frequency domain, and/or the second frequency domain range includes M consecutive frequency units in frequency domain, where N and M are positive integers. Optionally, the first frequency domain resource may be equivalent to the first frequency domain range, that is, the first frequency domain range includes all frequency units on the first frequency domain resource.

In a possible implementation, in the first frequency domain range, a plurality of time subunits included in the second time-frequency resource is consecutive or inconsecutive in time domain.

In a possible implementation, the first reference signal includes a plurality of reference signals corresponding to a plurality of antenna ports, and the first data includes data from the plurality of antenna ports; and in the first frequency domain range, at least two of the plurality of reference signals occupy different time subunits in time domain, and/or at least two of the plurality of reference signals occupy different frequency units in frequency domain. In other words, the plurality of reference signals may be transmitted in a time division multiplexing manner, a frequency division multiplexing manner, or a time division combined with frequency division multiplexing manner.

In a possible implementation, second configuration information is received, where the second configuration information includes multiplexing manner information of the reference signals corresponding to the plurality of antenna ports.

In a possible implementation, the first time-domain resource includes at least one time subunit of one or more first time units; and the first time unit successively includes, in time domain, at least one first time subunit, a first guard period (GP), at least one second time subunit, and a second guard period that are consecutive in time domain. In an example, the at least one first time subunit is used to map a signal (for example, in a downlink direction) from the first node, and the at least one second time subunit is used to map a signal (for example, in an uplink direction) sent to the first node.

According to a second aspect, an embodiment of this application provides a data transmission method. The method is performed by a primary node, or the method may be performed by a chip or an integrated circuit disposed on the primary node. This is not limited in this application. The primary node may manage a secondary node, has a function of allocating a resource, and is responsible for allocating a resource to the secondary node. The secondary node may obey scheduling of the primary node and uses the resource allocated by the primary node to communicate with the primary node. The method includes sending at least one piece of first configuration information to a second node, where the at least one piece of first configuration information indicates a first time-domain resource and/or a first frequency domain resource, the first time-domain resource and/or the first frequency domain resource are/is used to carry first data and a first reference signal, and the first reference signal is a demodulation reference signal of the first data; and transmitting the first reference signal on a second time-frequency resource, where the second time-frequency resource does not overlap a third time-frequency resource, the third time-frequency resource is used to carry second data and/or a control-type signal or control-type signaling, or the third time-frequency resource is not used to carry the first data and the first reference signal, and the first data is different from the second data.

Optionally, the method further includes determining the first time-domain resource and/or the first frequency domain resource based on the at least one piece of first configuration information, and/or determining the second time-frequency resource, and/or demodulating the first data based on the first reference signal. This step may be performed by a processing unit or a processor.

In a possible implementation, in a first frequency domain range, a time-domain start position of the second time-frequency resource is an earliest time subunit in time domain other than a first time-domain range in the first time-domain resource. In an example, in the first frequency domain range, a time-domain resource of the third time-frequency resource overlaps the first time-domain resource in the first time-domain range; or a time-domain start position of the second time-frequency resource is an earliest time subunit that may be used to carry the first reference signal in time domain in the first time-domain resource.

In a possible implementation, in the first frequency domain range, a time-domain start position of a time-frequency resource used to carry the first data is not earlier than the time-domain start position of the second time-frequency resource.

In a possible implementation, the first reference signal includes a plurality of reference signals corresponding to a plurality of antenna ports, and the first data includes data from the plurality of antenna ports; and in the first frequency domain range, at least two of the plurality of reference signals occupy different time subunits in time domain, and/or at least two of the plurality of reference signals occupy different frequency units in frequency domain.

In a possible implementation, second configuration information is sent, where the second configuration information includes multiplexing manner information of the reference signals corresponding to the plurality of antenna ports.

In the second aspect, a plurality of possible implementations may be further provided with reference to the descriptions of the first aspect.

According to a third aspect, a data transmission apparatus is provided, including: a transceiver unit, where the transceiver unit is configured to receive at least one piece of first configuration information from a first node, where the at least one piece of first configuration information indicates a first time-domain resource and/or a first frequency domain resource, the first time-domain resource and/or the first frequency domain resource are/is used to carry first data and a first reference signal, and the first reference signal is a demodulation reference signal of the first data; and the transceiver unit is further configured to transmit the first reference signal on a second time-frequency resource, where the second time-frequency resource does not overlap a third time-frequency resource, the third time-frequency resource is used to carry second data and/or a control-type signal or control-type signaling, or the third time-frequency resource is not used to carry the first data and the first reference signal, and the first data is different from the second data.

Optionally, the apparatus further includes a processing unit. The processing unit is configured to determine the first time-domain resource and/or the first frequency domain resource, and/or generate the first reference signal, and/or generate the first data.

In a possible implementation, the data transmission apparatus may be a secondary node, or a chip or an integrated circuit inside the secondary node.

In the third aspect, a plurality of possible implementations may be further provided with reference to the descriptions of the first aspect.

According to a fourth aspect, a data transmission apparatus is provided, including a transceiver unit, where the transceiver unit is configured to send at least one piece of first configuration information to a second node, where the at least one piece of first configuration information indicates a first time-domain resource and/or a first frequency domain resource, the first time-domain resource and/or the first frequency domain resource are/is used to carry first data and a first reference signal, and the first reference signal is a demodulation reference signal of the first data; and the transceiver unit is further configured to transmit the first reference signal on a second time-frequency resource, where the second time-frequency resource does not overlap a third time-frequency resource, the third time-frequency resource is used to carry second data and/or a control-type signal or control-type signaling, or the third time-frequency resource is not used to carry the first data and the first reference signal, and the first data is different from the second data.

Optionally, the apparatus further includes a processing unit. The processing unit is configured to determine the first time-domain resource and/or the first frequency domain resource based on the at least one piece of first configuration information, and/or determine the second time-frequency resource, and/or demodulate the first data based on the first reference signal.

In a possible implementation, the data transmission apparatus may be a primary node, or a chip or an integrated circuit inside the primary node.

In the third aspect, a plurality of possible implementations may be further provided with reference to the descriptions of the first aspect.

According to a fifth aspect, this application further provides a non-transitory computer-readable storage medium, configured to store a computer program, where the computer program includes instructions used to implement the method in any one of the foregoing aspects or the possible implementations of the foregoing aspects.

According to a sixth aspect, an embodiment of this application further provides a computer program product including instructions. When the computer program product runs on a computer, the computer is enabled to implement the methods in any one of the foregoing aspects or the possible implementations of the foregoing aspects.

According to a seventh aspect, an embodiment of this application further provides a chip apparatus, including at least one processor and an interface circuit. The interface circuit is configured to provide sending or receiving of data, instructions, or information for the at least one processor. When the at least one processor executes program code or the instructions, the method in any one of the foregoing aspects or the possible implementations of the foregoing aspects is implemented.

According to an eighth aspect, an embodiment of this application further provides a cockpit system, including at least one of the data transmission apparatus in the third aspect and the data transmission apparatus in the fourth aspect, or including the chip apparatus provided in the seventh aspect.

According to a ninth aspect, an embodiment of this application further provides a terminal. The terminal may be a transport vehicle or an intelligent device, and includes an uncrewed or unmanned aerial vehicle, an unmanned transport vehicle, an intelligent vehicle, a robot, or the like. The terminal includes at least one of the data transmission apparatus in the third aspect and the data transmission apparatus in the fourth aspect, or including the chip apparatus provided in the seventh aspect.

The data transmission method, the data transmission apparatus, and the like provided in embodiments are all configured to perform the data transmission method provided above. Therefore, for beneficial effects that can be achieved by the data transmission method, the data transmission apparatus, and the like, refer to beneficial effects in the data transmission method provided above. Details are not described herein again.

DESCRIPTION OF EMBODIMENTS

The following describes technical solutions of this application with reference to the accompanying drawings.

Figure 1:
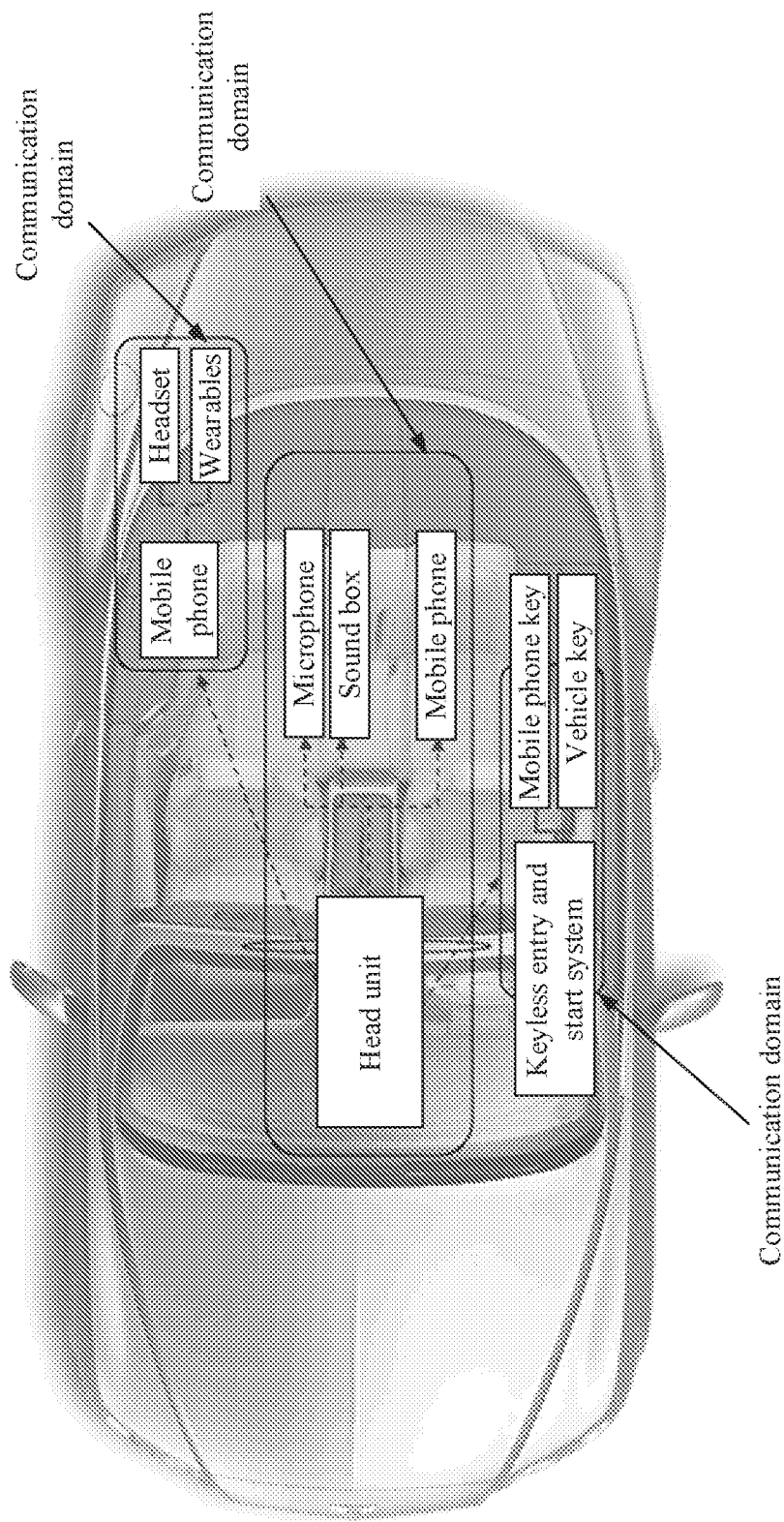
FIG. 1 is a schematic diagram of a topological relationship of in-vehicle communication links.

FIG. 1 is a schematic diagram of a topological relationship of in-vehicle communication links in communication domains of a vehicle. A communication domain is a system including a group of communication nodes having communication relationships and communication connection relationships (namely, communication links) between the communication nodes. One communication domain includes one primary node and at least one secondary node. A communication domain includes a mobile phone, a headset, and wearables. Another communication domain includes a head unit, microphone, sound box, and mobile phone. Another communication domain includes a keyless entry and start system, a mobile phone key, and a vehicle key.

Figure 2:
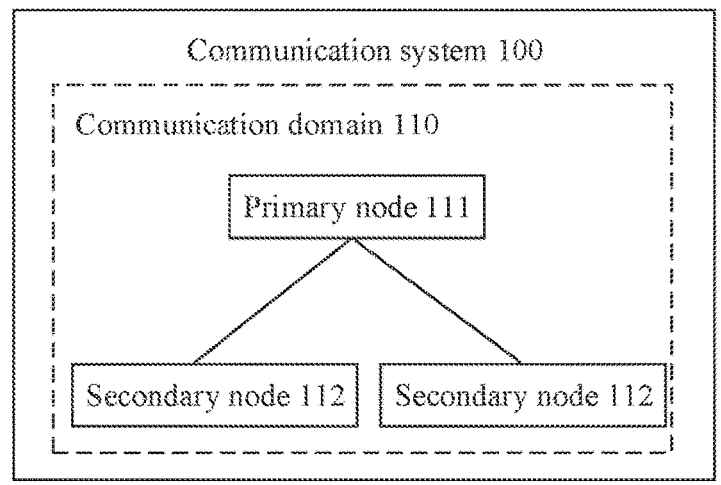
FIG. 2 is a schematic diagram of a communication system 100 according to an embodiment of this application.

FIG. 2 is a schematic block diagram of a communication system 100 according to an embodiment of this application. The communication system 100 includes at least one communication domain. FIG. 2 shows a communication domain 110. The communication domain 110 includes a primary node 111 and a plurality of secondary nodes 112.

It should be noted that, the primary node 111 in this embodiment of this application is an apparatus that can communicate with the secondary node 112 and has a capability of managing the secondary node 112 (for example, scheduling a resource for the secondary node 112).

It should be further noted that the secondary node 112 in this embodiment of this application is an apparatus that can obey management of the primary node 111 and has a capability of performing communication by using a resource allocated by the primary node 111.

Optionally, the communication domain 110 may be applied to a plurality of environments. This is not limited in this embodiment of this application.

In a possible implementation, the communication domain 110 may be applied to a cockpit (also referred to as a cabin) environment of a motor vehicle (for example, an intelligent vehicle, an electric vehicle, or a digital vehicle).

In another possible implementation, the communication domain 110 may be applied to an intelligent terminal device, for example, a smart device applied to a smart home environment.

Optionally, the primary node 111 may communicate with the secondary node 112 in a plurality of manners. This is not limited in this embodiment of this application.

In a possible implementation, the primary node 111 may communicate with the secondary node 112 in a wireless manner. The primary node 111 may further communicate with the secondary node 112 in a wired manner. This is not limited in this application. It should be noted that, the wired manner may implement communication by using a data cable connection or an internal bus connection.

It should be noted that, the foregoing wireless manner may be that communication is implemented by using a communication network. The communication network may be a local area network, or may be a wide area network transferred by using a relay device, or may include a local area network and a wide area network. When the communication network is a local area network, for example, the communication network may be a WIFI hotspot network, a WIFI peer-to-peer (P2P) network, a BLUETOOTH network, a ZIGBEE network, a near-field communication (NFC) network, or a possible future general short range communication network. When the communication network is a wide area network, for example, the communication network may be a 3rd generation mobile communication technology (3G) network, a 4th generation mobile communication technology (4G) network, a 5th generation mobile communication technology (5G) network, a public land mobile network (PLMN), the Internet, or even a 6th generation or 7th generation mobile communication technology. This is not limited in this embodiment of this application.

It should be noted that the primary node in this embodiment of this application may have a plurality of forms, and may also be referred to as a control apparatus or a control device. This is not specifically limited in this embodiment of this application.

In a possible implementation, the primary node may be an independent device.

In another possible implementation, the primary node may be integrated in the device as a functional module or a chip apparatus.

In an example, the primary node may be an evolved NodeB (eNB or eNodeB) in a Long-Term Evolution (LTE) system, or may be a radio controller in a cloud radio access network (CRAN) scenario. Alternatively, the access device may be a relay station, an access point, a vehicle-mounted device, a wearable device, an access device in a 5G network, a network device in a future evolved PLMN, or the like, or may be an access point (AP) in a wireless local area network (WLAN), a next generation node B (gNodeB or gNB) in a new radio (NR) system, a control device or a control apparatus in a cockpit domain, or a control device or a control apparatus in a scenario including the intelligent terminal device. This is not limited in this embodiment of this application.

It should be further noted that the secondary node may have a plurality of forms, and may also be referred to as a terminal or a terminal apparatus. This is not limited in this embodiment of this application.

In a possible implementation, the secondary node may be an independent device.

In another possible implementation, the secondary node may be integrated in the device as a functional module or a chip apparatus.

In an example, the secondary node may be an apparatus for providing voice/data connectivity for a user, for example, a handheld device with a wireless connection function or a vehicle-mounted device, for example, a mobile phone, a tablet computer, a notebook computer, a palmtop computer, a mobile internet device (MID), a wearable device, a virtual reality (VR) device, an augmented reality (AR) device, a wireless terminal in self driving, a cellular phone, a cordless phone, a session initiation protocol (session initiation protocol, SIP) phone, a personal digital assistant (PDA), a handheld device with a wireless communication function, a computing device, a vehicle-mounted device, a smart home device, a wearable device, a terminal device in the 5G network, or a terminal device in the future evolved PLMN. This is not limited in this embodiment of this application.

It should be further noted that, the wearable device may also be referred to as a wearable intelligent device, and is a general term for wearable devices such as glasses, gloves, watches, clothes, and shoes that are developed by applying wearable technologies to intelligent designs of daily wear. The wearable device is a portable device that is directly worn on a body or integrated into clothes or an accessory of a user.

In a possible implementation, an example in which the communication domain 110 is applicable to a cockpit domain environment is used. Based on a relationship between a secondary node and a cockpit, the secondary node may include the following two terminal types: a "vehicle-mounted terminal device" and a "non-vehicle-mounted terminal device".

The "vehicle-mounted terminal device" is also referred to as an on-board unit (OBU), and is a device that is integrated or installed in a cockpit domain and belongs to a part of the cockpit domain, for example, a vehicle-mounted speaker, a vehicle-mounted microphone, a vehicle-mounted display, or a vehicle-mounted camera. In general, the vehicle-mounted terminal device may be a device factory-installed on a vehicle by a vehicle manufacturer.

The "non-vehicle-mounted terminal device" is a device that is placed in the cockpit domain and can communicate with or connect to another device in the cockpit domain, but does not belong to a part of the cockpit, for example, a smartphone, a tablet computer, a Bluetooth headset, or a wearable device of a user.

In a possible implementation, the primary node may be a cockpit domain controller (CDC), the CDC may communicate with a plurality of secondary nodes, and the plurality of secondary nodes may include at least one terminal type of the vehicle-mounted terminal device or the non-vehicle-mounted terminal device.

In a conventional technology, information such as a plurality of types of services and/or data, a reference signal, and control-type signaling or signals may be transmitted between a primary node and a plurality of secondary nodes. Due to existence of various different information, a resource conflict inevitably occurs when a corresponding resource is configured or defined. To resolve the foregoing resource conflict, a communication system may assign different priorities to the foregoing different information. For example, a time-domain resource configured for transmission of first-type information may overlap a time-domain resource configured for transmission of second-type information. To ensure normal transmission, the second-type information with a lower priority is not transmitted on an overlapping resource, and the overlapping resource is used to transmit the first-type information with a higher priority. In this way, transmission performance of the second-type information is degraded. If the second-type information is a reference signal used to demodulate specific data in this case, transmission performance of the data may be severely degraded, and communication efficiency of the entire communication system is further affected.

To resolve this problem, an embodiment of this application provides a data transmission method, to flexibly configure a time-frequency resource used for a plurality of types of information, improve transmission performance of the plurality of types of information as much as possible, and improve communication efficiency of a communication system.

It should be noted that any type of configuration information in the solutions provided in this application may be carried by using any type of information or signaling, for example, higher layer signaling or physical layer signaling. In an example, the higher layer signaling may include radio resource control (RRC) signaling, and the physical layer signaling may include downlink control information (DCI), and the like. For details about the configuration information below, refer to the descriptions in this paragraph.

Figure 3:
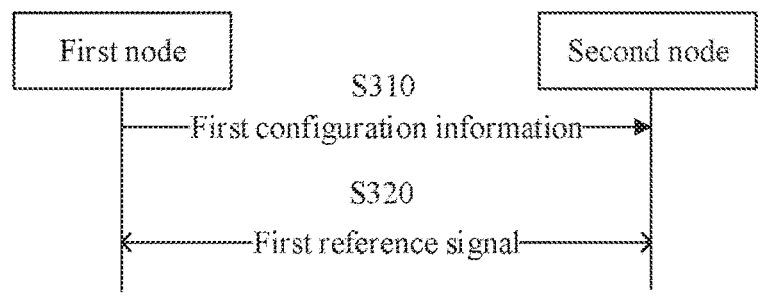
FIG. 3 is a schematic diagram of a data transmission method 300 according to an embodiment of this application.

FIG. 3 is a schematic flowchart of a data transmission method 300 according to an embodiment of this application. The data transmission method relates to interaction between two data transmission apparatuses. For clarity of description, method steps performed by the two data transmission apparatuses are separately explained by using a first node (e.g., a primary node) and a second node (e.g., a secondary node) as an example. Any data transmission apparatus may include a transceiver unit or a transceiver, and a processing unit or a processor. The method includes the following steps.

S310: The first node sends at least one piece of first configuration information to the second node. Correspondingly, the second node receives the at least one piece of configuration information from the first node. The at least one piece of first configuration information indicates a first time-domain resource and/or a first frequency domain resource, the first time-domain resource and/or the first frequency domain resource are/is used to carry first data and a first reference signal, and the first reference signal is a demodulation reference signal of the first data. The first time-domain resource may include one or more time subunits in at least one time unit. The first frequency domain resource may include one or more frequency ranges including at least one frequency unit. This step may be performed by the transceiver unit or the transceiver of the data transmission apparatus.

Further optionally, the first time-domain resource may be indicated by using a plurality of pieces of configuration information. In an example, the plurality of pieces of configuration information may separately indicate at least one time unit included in the first frequency domain resource and one or more time subunits in the at least one time unit. Optionally, one or more time subunits in the at least one time unit may be indicated by using configuration information of an uplink-downlink configuration of the time unit.

Optionally, the method further includes that the first node determines the first time-domain resource and/or the first frequency domain resource. Correspondingly, the second node determines the first time-domain resource and/or the first frequency domain resource based on the at least one piece of first configuration information. This step may be performed by the processing unit or the processor of the data transmission apparatus.

It should be noted herein that the at least one piece of configuration information may be used to configure the first time-domain resource in a manner of configuring at least one time unit, or may be used to configure the first time-domain resource in a manner of configuring one or more time subunits in the at least one time unit. In an example, each time unit may include different time-domain sub-resources corresponding to different transmission directions and/or at least one guard period. A person skilled in the art may understand that, based on the former manner, the at least one piece of configuration information may still indicate a resource that may actually be used to carry the first data and the first reference signal, that is, a time-domain sub-resource and the guard period whose transmission direction is different from the first data and the first reference signal need to be excluded from each time unit. For an example of a time unit structure, refer to the following descriptions. Therefore, for ease of description, in this application, the solution is described below by using an example in which the at least one piece of configuration information indicates one or more time subunits in the at least one time unit and the first time-domain resource is one or more time subunits in the at least one time unit. However, this application does not exclude that the first time-domain resource is configured in a manner of configuring at least one time unit.

For example, the at least one piece of configuration information indicates the one or more time subunits in the at least one time unit. For example, a quantity of the at least one time unit may be J, where J is a positive integer, for example, J may be 2. Further, the at least one or more time subunits may be the first K time subunits of each time unit, where K is a positive integer, and specifically, K may be 2, 4, or the like.

In an optional design, the at least one piece of first configuration information indicates only the first time-domain resource or the first frequency domain resource. If the at least one piece of first configuration information indicates only the first time-domain resource, the first frequency domain resource may be predefined, or agreed on or configured in another manner. For example, a width of the first frequency domain resource may be a full bandwidth of a communication system, such as a system bandwidth of 20 megahertz (MHz). Alternatively, if the at least one piece of first configuration information indicates only the first frequency domain resource, the first time-domain resource may be predefined, or agreed on or configured in another manner. This is not limited in this application. It is used that the second node can determine the first frequency domain resource or the first time-domain resource that is not configured by using the at least one piece of first configuration information.

In an optional design, the first configuration information indicates the first time-domain resource and the first frequency domain resource, and the first time-domain resource and the first frequency domain resource indicate a first time-frequency resource. The first time-frequency resource configuration is used by the first node and the second node to transmit the first data and the first reference signal. The transmission herein may be bidirectional, that is, may be used by the first node to send data and a reference signal to the second node, or may be used by the second node to send data and a reference signal to the first node.

In this embodiment of this application, for the first node, refer to the foregoing descriptions about the primary node. For the second node, refer to the foregoing descriptions about the secondary node.

S320: Transmit the first reference signal on a second time-frequency resource, where the second time-frequency resource does not overlap a third time-frequency resource. The third time-frequency resource is used to carry second data and/or a control-type signal or control-type signaling, or the third time-frequency resource is not used to carry the first data and the first reference signal. The first data is different from the second data. The control-type signal or the control-type signaling may also be collectively referred to as system overheads. In an example, the "transmission" may be understood as "sending" or "receiving". This step may be performed by the transceiver unit or the transceiver of the data transmission apparatus.

Optionally, the method further includes: receiving the first data, and demodulating the first data based on the first reference signal. The receiving step may be performed by the transceiver unit or the transceiver of the data transmission apparatus, and the demodulation step may be performed by the processing unit or the processor of the data transmission apparatus.

In an example, the method further includes generating the first reference data and the first data. This step may be performed by the processing unit or the processor of the data transmission apparatus.

In an example, the second time-frequency resource belongs to the first time-frequency resource indicated by the first time-domain resource and the first frequency domain resource. In other words, a frequency domain range of the second time-frequency resource belongs to the first frequency domain resource, and a time-domain range of the second time-frequency resource belongs to the first time-domain resource. Optionally, the third time-frequency resource may belong to the first time-frequency resource, or may overlap the first time-frequency resource. Alternatively, the third time-frequency resource may not overlap the first time-frequency resource.

In an optional design, the method includes step S330: The first node sends resource configuration information to the second node, where the resource configuration information indicates the third time-frequency resource. Optionally, the second node may obtain the second data and/or the control-type signal or the control-type signaling by using the third time-frequency resource. In an example, the second node can obtain a position of the third time-frequency resource by using the resource configuration information, for example, a frequency domain range, a frequency domain start position and/or a time-domain range, and a time-domain start position of the third time-frequency resource.

Further optionally, the third time-frequency resource may be configured by using a periodicity T in time domain. For example, T may be a length of one time unit, a length of a plurality of time units, or a length of one or more time subunits. T is a positive integer quantity of time subunits or time units. Optionally, the periodicity T of the third time-frequency resource is one frame or one radio frame, and then the third time-frequency resource occupies a same symbol position and a same quantity of symbols on a plurality of frames or radio frames.

In an implementation, the second data is noise canceling service data, and/or the control-type signal or the control-type signaling includes at least one of a synchronization signal, acknowledgment/non-acknowledgment feedback information, a broadcast message, a system message, physical layer control signaling, higher layer signaling, a demodulation reference signal for a specific service (where a type of the specific service is different from a service type of the first data), a phase tracking reference signal, a positioning reference signal, a channel state information reference signal, access request signaling or an access request signal, scheduling request signaling or scheduling request signal, channel feedback information, and channel sounding reference signal.

Based on the foregoing optional design, the first data may be non noise-canceling service data. Alternatively, a type of the first data is different from a type of the second data. For example, the first data may be data related to at least one of a multimedia service, a web page browsing service, and a file transmission service. Optionally, when there is a plurality of types of service data with different priorities, the second data may be all types of data of or a part of types of data whose priority is higher than the first data, which may depend on a system design.

According to the solution provided in this application, different types of data and/or reference signals can occupy different time-frequency resources, a resource conflict is avoided, transmission and demodulation performance of different types of data is improved, and communication efficiency of the communication system is improved.

In an optional design, in a first frequency domain range, a time-domain start position of the second time-frequency resource is an earliest time subunit in time domain other than a first time-domain range in the first time-domain resource, or a time-domain start position of the second time-frequency resource is an earliest time subunit that may be used to carry the first reference signal in time domain in the first time-domain resource. In an example, in the first frequency domain range, a time-domain resource of the third time-frequency resource overlaps the first time-domain resource in the first time-domain range. The first frequency domain range satisfies the following conditions: belonging to the first frequency domain resource, and also belonging to the frequency domain range of the second time-frequency resource. In an example, the first frequency domain range may be any frequency domain range that satisfies the foregoing conditions. For example, the first frequency domain range may be an entire frequency domain range of the first frequency domain resource.

It should be noted herein that, in the first frequency domain range, the time-domain resource of the third time-frequency resource and the first time-domain resource may not overlap in the first time-domain range. In this scenario, it may be understood as that a time-domain length of the first time-domain range is 0 time subunits.

In an example, the time subunit is an allocation granularity of a time-domain resource. For example, the allocation granularity may be one symbol, one mini-slot, one slot, one subframe, or one frame. Further, the symbol may be an orthogonal frequency division multiplexing (OFDM) symbol, the slot may include a plurality of symbols, and the subframe may include one or more slots. A plurality of time subunits constitutes a time unit. The time unit may be a frame (also referred to as a radio frame), a subframe, a superframe, or the like. A quantity of time subunits constituting the time unit may be preset or predefined, such as pre-agreed on in a standard or protocol. One superframe may include a plurality of radio frames, such as 48. This application does not limit a length of the time unit and the time subunit.

In possible implementation, the time subunit is a symbol, the time unit is a frame, also referred to as a radio frame. For example, duration of each frame may be about 20.83 microseconds (µs), each frame may include S symbols, and S is a positive integer. For example, S may be 7 or 8. An example of a possible frame structure is shown in FIG. 4A.

Figure 4A:
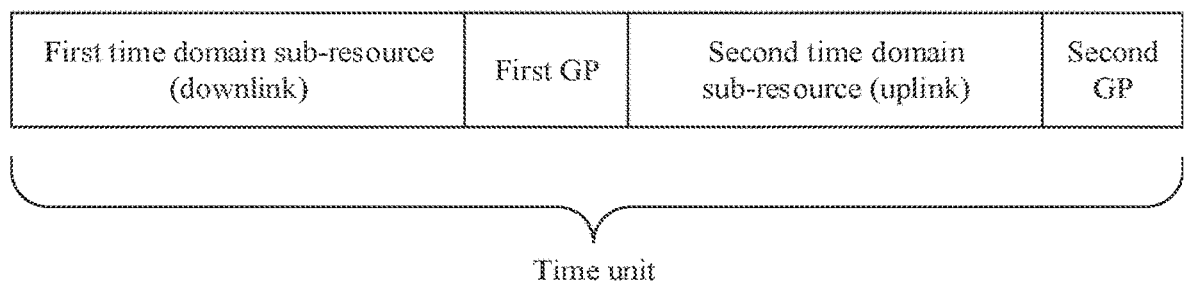
FIG. 4A is a schematic diagram of a possible frame structure according to an embodiment of this application.

A possible time unit shown in FIG. 4A sequentially includes, in time domain, a first time-domain sub-resource including at least one time subunit, a first guard period GP, a second time-domain sub-resource including at least one second time subunit, and a second guard period. The first time-domain sub-resource is used for transmission from the first node to the second node, also referred to as downlink transmission, and the second time-domain sub-resource is used for transmission from the second node to the first node, also referred to as uplink transmission. For the first node, the first guard GP and the second GP are respectively used to perform transmitting-receiving conversion and receiving-transmitting conversion. Optionally, the first time-domain sub-resource may include S1 symbols, and the second time-domain sub-resource may include S2 symbols. S1 and S2 are positive integers. For example, S1 is 5 and S2 is 3. For example, both S1 and S2 are 4. This application does not limit a specific frame structure.

Based on this possible implementation, it can be learned that symbols in a time unit included in the first time-domain resource in this application may be all symbols in the time unit that have a same transmission direction as the first data and the first reference signal, for example, the first time-domain resource includes the first time-domain sub-resource shown in FIG. 4A. This implementation is simple, so that the first node and the second node can efficiently determine symbol positions that can be used to transmit the first data and the first reference signal in a time unit. Optionally, a symbol in a time unit included in the first time-domain resource may be a part of symbols in all symbols in the time unit that have a same transmission direction as the first data and the first reference signal. For example, the first time-domain resource includes a part of the first time-domain sub-resource shown in FIG. 4A. In this implementation, the part of symbols in the time unit may be configured to carry the first data and the first reference signal, and another symbol in a same direction may be configured to carry other information. This can improve resource utilization and scheduling flexibility.

It should be noted herein that "may be used" is a functional definition of a resource that can be used to carry the first reference signal. In addition to the first reference signal and the first data, there may be a plurality of other types of data and/or signals. In the plurality of types of data and/or signals, there is information that needs to be preferentially transmitted, such as the second data, the system overheads, and the control-type signaling or the control-type signal. Therefore, it is considered that resources need to be reserved for the information that needs to be preferentially transmitted on the first time-domain resource in a corresponding frequency domain range. After these reserved resources are excluded, a remaining resource may be referred to as a resource that "may be used" to carry the first reference signal.

Further, in a possible implementation, the communication system may further set or specify that one or more time subunits in a time unit may be used to carry a reference signal, that is, not all time subunits in the time unit that have a same transmission direction as the reference signal can be used to carry the reference signal. Based on this, even if the first time-domain resource occupies more time subunit of the at least one time unit, the first reference signal can be transmitted only in the set or specified one or more time subunits. For example, the first R symbols of at least one time unit may be set to carry the first reference signal, and a transmission direction of more than R time subunits in the time unit may be the same as that of the first reference signal. Optionally, R may be 4. It should be noted that a value of R may be preset or specified according to a specific rule, and the rule is not limited herein. Combined with this possible implementation, resources need to be reserved for the information that needs to be preferentially transmitted on the first time-domain resource in a corresponding frequency domain range. Therefore, excluding these reserved resources and combined with the set or specified rule, a remaining resource may be further referred to as a resource that "may be used" to carry the first reference signal.

Further, in the first frequency domain range, a time-domain start position of a time-frequency resource used to carry the first data is not earlier than the time-domain start position of the second time-frequency resource.

For example, the time-domain start position of the time-frequency resource used to carry the first data and the time-domain start position of the second time-frequency resource are different time subunits. In time domain, a time subunit in which the time-domain start position of the time-frequency resource used to carry the first data is located is later than a time subunit in which the time-domain start position of the second time-frequency resource is located.

Figure 4B:
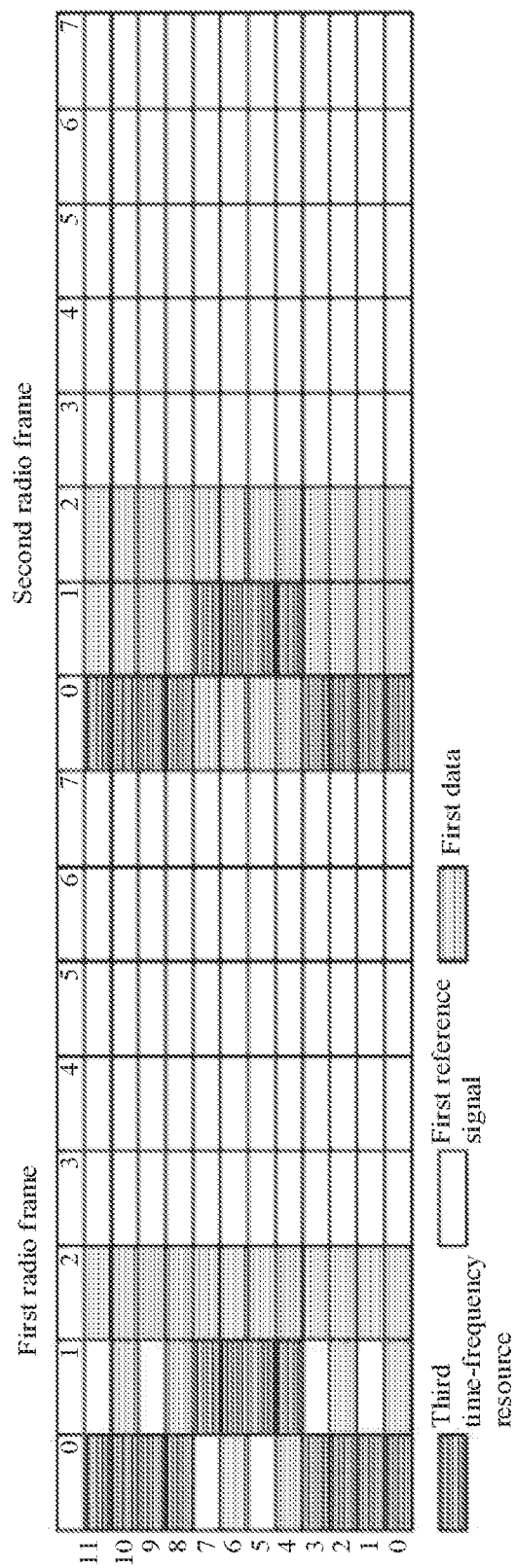
FIG. 4B is a schematic diagram of a possible data transmission manner according to an embodiment of this application.

For another example, the time-domain start position of the time-frequency resource used to carry the first data and the time-domain start position of the second time-frequency resource are a same time subunit. In this example, the first data and the first reference signal may multiplex the time subunit in a frequency division manner. In an example, the first frequency-domain range may include a plurality of frequency units, and the first data and the first reference signal are located in different frequency units in the time subunit. For details, refer to FIG. 4B. FIG. 4B is a schematic diagram of a possible data transmission manner in a different frequency range. It should be noted that schematic diagrams of a plurality of possible data transmission manners provided in this application are all shown in an example manner that a horizontal direction is a time domain (using a symbol as a time subunit) and a vertical direction is a frequency domain (using a subcarrier as a frequency unit).

For example, four frequency units form a frequency-domain range. The first frequency-domain resource is configured to include three consecutive frequency-domain ranges. The first time-domain resource is configured to include the first three time subunits in a first time unit and the first three time subunits in a second time unit. The time unit may be a radio frame, the time subunit may be a symbol, and the frequency unit is a subcarrier. In an example, the first three time subunits may be all or a part of symbols in the radio frame that have a same transmission direction as the first data and the first reference signal. Further, the third time-frequency resource occupies, for example, subcarriers 0 to 3 and subcarriers 8 to 11 on a symbol 0, and subcarriers 4 to 7 on a symbol 1, and these time-frequency resources cannot be used to transmit the first data and the first reference signal. Further, in this example, based on preset settings or regulations, the first three time subunits in the first time unit and the first three time subunits in the second time unit may be used to carry the first reference signal.

Therefore, in the first frequency-domain range and the third frequency-domain range: on the subcarriers 0 to 3 and the subcarriers 8 to 11, the symbol 0 cannot be used to transmit the first data and the first reference signal. In other words, in the frequency-domain range, the first time-domain range in which the first time-domain resource overlaps the time-domain resource of the third time-frequency resource is the symbol 0. Therefore, in the first frequency-domain range and the third frequency-domain range, the time-domain resource that may be used for the first data and the first reference signal, that is, the time-domain range of the second time-frequency resource, starts from the symbol 1. Therefore, the symbol 1 is an earliest time subunit in time domain other than the first time-domain range in the first time-domain resource, or the time-domain start position of the second time-frequency resource is an earliest time subunit that may be used to carry the first reference signal in time-domain in the first time-domain resource.

Further, the symbol 1 may be the time-domain start position of the second time-frequency resource used to carry the first reference signal. If the first reference signal occupies one symbol, the time-domain range of the second time-frequency resource is the symbol 1. If the first reference signal occupies a plurality of symbols, the second time-frequency resource may occupy, starting from the symbol 1, a plurality of consecutive or inconsecutive symbols that are in the first time-domain range and that do not overlap the time-domain range of the third time-frequency resource. Further, on the symbol 1, the first reference signal and the first data may be transmitted in a frequency division manner. The first frequency-domain range is used as an example. On the symbol 1, the first reference signal may occupy subcarriers 1 and 3, and the first data may occupy subcarriers 0 and 2. For transmission in the second and third frequency-domain ranges, refer to the foregoing same rule. Details are not described herein again.

In this transmission manner, transmission efficiency of the first data can be improved, and a transmission delay of the first data can be reduced.

In this optional design, in a specific frequency-domain range, if the time-domain resource of the third time-frequency resource may overlap the first time-domain resource in a specific time-domain range, the time-domain start position of the second time-frequency resource is an available time subunit in time domain in the first time-domain range (where the overlapping time-domain range is excluded). In this way, it can be ensured that sending of the first reference signal may be not later than sending of the first data, and demodulation efficiency and performance of the first data are ensured.

It should be noted that the first frequency-domain resource may include a plurality of frequency-domain ranges, and the plurality of frequency-domain ranges include the first frequency-domain range. Optionally, the plurality of frequency-domain ranges may include at least two frequency-domain ranges with different frequency-domain widths. Further, the first frequency-domain resource may further include at least one second frequency-domain range.

In an example, in the second frequency-domain range, the time-domain resource of the third time-frequency resource and the first time-domain resource may overlap in a second time-domain range that is the same as or different from the first time-domain range. Further, in the second frequency-domain range, a time-domain start position of a time-frequency resource used to carry the first data is still not earlier than the time-domain start position of the second time-frequency resource. In the second frequency-domain range, the time-domain start position of the second time-frequency resource may be the same as or different from the time-domain start position of the second time-frequency resource in the first frequency-domain range, which depends on whether there is a difference between the first time-domain range and the second time-domain range.

Further optionally, each frequency-domain range may include one or more frequency units, and the plurality of frequency units are consecutive in time domain, that is, the plurality of frequency units are adjacent to each other in frequency domain. The frequency unit is an allocation granularity of a frequency-domain resource. The allocation granularity may be a frequency resource granularity such as a subcarrier, a subcarrier group including a plurality of consecutive subcarriers, a frequency subband of a specific length, or a physical resource block (PRB) (referring to an existing technology of an LTE system). In an example, the frequency unit may include one or more consecutive foregoing allocation granularities, and a quantity of the foregoing allocation granularities included in each frequency unit may be preconfigured, or may be predefined in a protocol or a standard. The first frequency-domain range includes N consecutive frequency units in frequency domain, and/or the second frequency-domain range includes M consecutive frequency units in frequency domain, where N and M are positive integers, and N and M may be the same or different.

In an optional implementation, the frequency unit is a subcarrier, and a frequency-domain range in the plurality of frequency-domain ranges may include P subcarriers, where P is a positive integer. Optionally, P may be 4 or 8.

Further, in each frequency-domain range, a plurality of time subunits included in the second time-frequency resource are consecutive or inconsecutive in time domain. For example, the third time-frequency resource occupies the second time subunit in the first time unit in time domain. Therefore, the second time-frequency resource may use the first time subunit in the first time unit as a time-domain start position. Further, the second time-frequency resource includes a plurality of time subunits in time domain, and the second time-frequency resource may include the third time subunit in the first time unit, that is, the first time subunit and the third time subunit are not consecutive in time domain.

It should be noted that, in another optional design, alternatively, in the first frequency-domain range, the time-domain start position of the time-frequency resource used to carry the first data may be earlier than the time-domain start position of the second time-frequency resource, for example, a scenario in which the first frequency-domain range is equivalent to the first frequency-domain resource. For details, refer to the following descriptions (FIG. 5B).

Figure 5A:
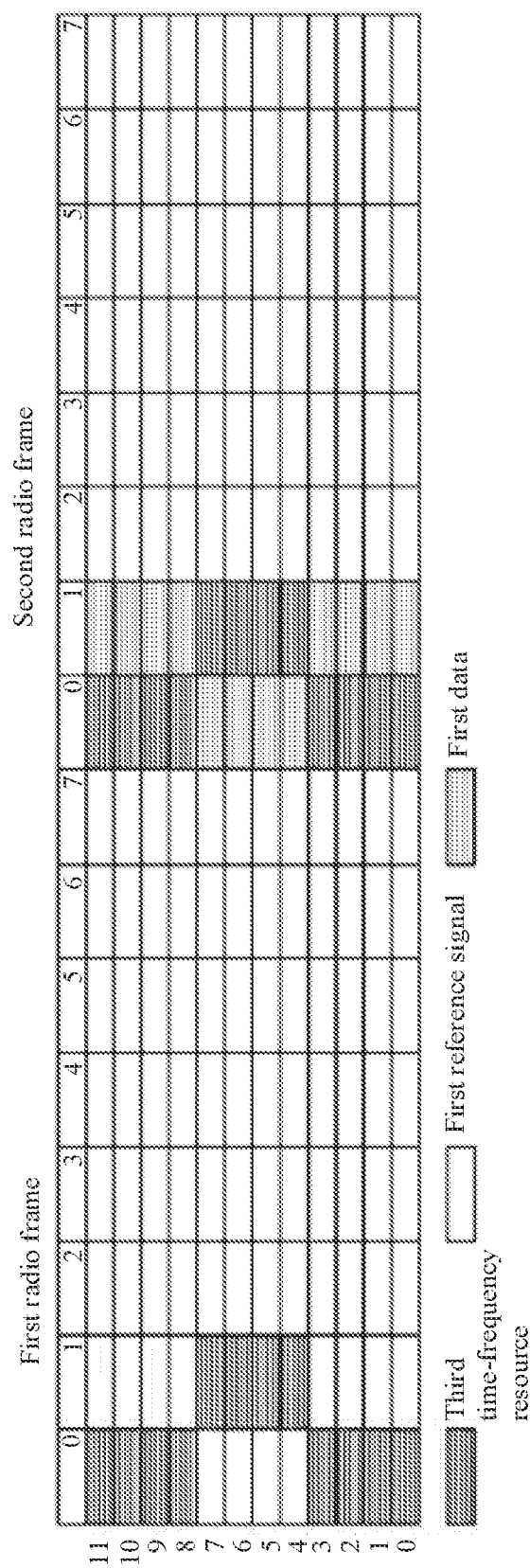
FIG. 5A is a schematic diagram of another possible data transmission manner according to an embodiment of this application.
Figure 5B:
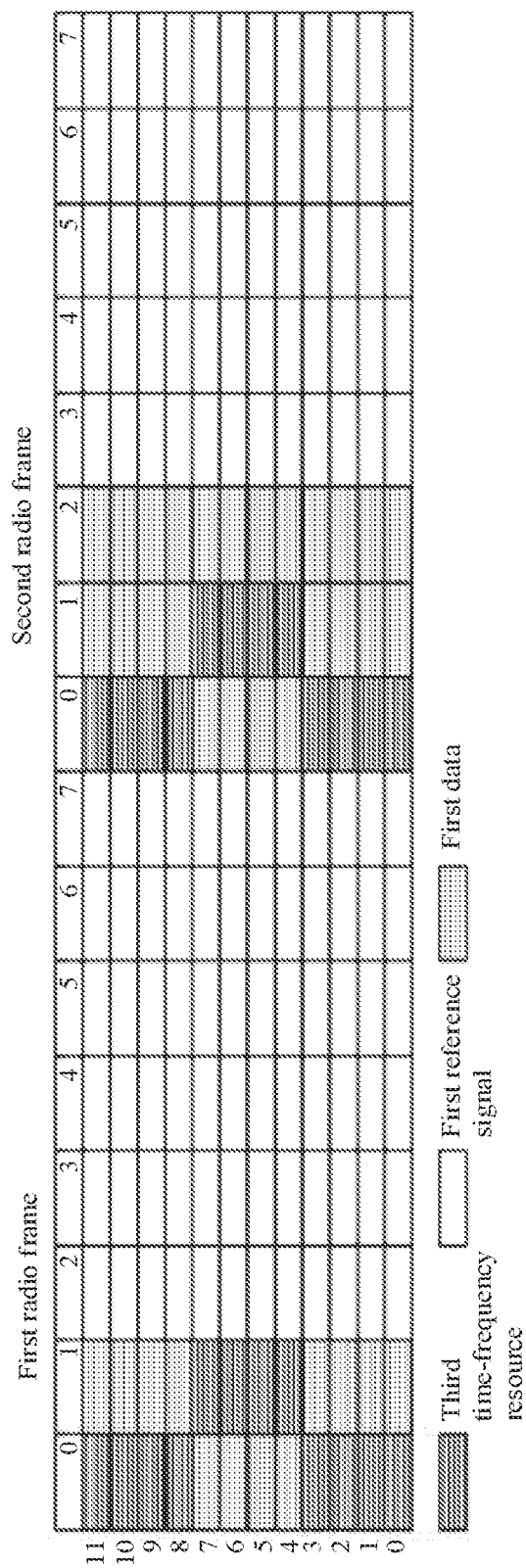
FIG. 5B is a schematic diagram of another possible data transmission manner according to an embodiment of this application.

For example, FIG. 5A is a schematic diagram of a possible data transmission manner in a different frequency range. For example, four frequency units form a frequency-domain range. The first frequency-domain resource is configured to include three consecutive frequency-domain ranges. The first time-domain resource is configured to include the first two time subunits in a first time unit and the first two time subunits in a second time unit. The time unit may be a radio frame, the time subunit may be a symbol, and the frequency unit is a subcarrier. In an example, the first two time subunits may be all or a part of symbols in the radio frame that have a same transmission direction as the first data and the first reference signal. Further, the third time-frequency resource occupies, for example, subcarriers 0 to 3 and subcarriers 8 to 11 on a symbol 0, and subcarriers 4 to 7 on a symbol 1, and these time-frequency resources cannot be used to transmit the first data and the first reference signal. Further, in this example, based on preset settings or regulations, the first two time subunits in the first time unit and the first two time subunits in the second time unit may be used to carry the first reference signal.

Therefore, in the first frequency-domain range and the third frequency-domain range: on the subcarriers 0 to 3 and the subcarriers 8 to 11, the symbol 0 cannot be used to transmit the first data and the first reference signal. In other words, in the frequency-domain range, the first time-domain range in which the first time-domain resource overlaps the time-domain resource of the third time-frequency resource is the symbol 0. Therefore, in the first frequency-domain range and the third frequency-domain range, the time-domain resource that may be used for the first data and the first reference signal, that is, the time-domain range of the second time-frequency resource, starts from the symbol 1. Therefore, the symbol 1 is an earliest time subunit in time domain other than the first time-domain range in the first time-domain resource, or the time-domain start position of the second time-frequency resource is an earliest time subunit that may be used to carry the first reference signal in time domain in the first time-domain resource.

Further, the symbol 1 may be the time-domain start position of the second time-frequency resource used to carry the first reference signal. If the first reference signal occupies one symbol, the time-domain range of the second time-frequency resource is the symbol 1. If the first reference signal occupies a plurality of symbols, the second time-frequency resource may occupy, starting from the symbol 1, a plurality of consecutive or inconsecutive symbols that are in the first time-domain range and that do not overlap the time-domain range of the third time-frequency resource. For example, if the first reference signal occupies two symbols, the symbol 0 of the second radio frame may alternatively be used to carry the first reference signal. The symbol 1 of the first radio frame and the symbol 0 of the second radio frame that are used to carry the first reference signal are consecutive in time domain. Further, the symbol 1 of the second radio frame may be used to carry the first data.

Therefore, in the second frequency-domain range: on the subcarriers 4 to 7, the symbol 1 cannot be used to transmit the first data and the first reference signal. In other words, in the frequency-domain range, the first time-domain range in which the first time-domain resource overlaps the time-domain resource of the third time-frequency resource is the symbol 1. Therefore, in the second frequency-domain range, the time-domain resource that may be used for the first data and the first reference signal, that is, the time-domain range of the second time-frequency resource, starts from the symbol 0. Therefore, the symbol 0 is an earliest time subunit in time domain other than the first time-domain range in the first time-domain resource, or the symbol 0 is an earliest time subunit that may be used to carry the first reference signal in time domain in the first time-domain resource.

Further, the symbol 0 may be the time-domain start position of the second time-frequency resource used to carry the first reference signal. If the first reference signal occupies one symbol, the time-domain range of the second time-frequency resource is the symbol 0. If the first reference signal occupies a plurality of symbols, the second time-frequency resource may occupy, starting from the symbol 0, a plurality of consecutive or inconsecutive symbols that are in the first time-domain range and that do not overlap the time-domain range of the third time-frequency resource. For example, if the first reference signal occupies two symbols, the symbol 0 of the second radio frame may alternatively be used to carry the first reference signal. The symbol 0 of the first radio frame and the symbol 0 of the second radio frame that are used to carry the first reference signal are inconsecutive in time domain. Further, the symbol 1 of the second radio frame may be used to carry the first data.

For example, FIG. 5B provides another possible data transmission manner. In this example, a frequency-domain range includes F frequency units included in the first frequency-domain resource. F is a positive integer, for example, F may be equal to 12. The first frequency-domain resource is configured to include only one frequency-domain range. The first time-domain resource is configured to include the first three time subunits in a first time unit and the first three time subunits in a second time unit. The time unit may be a radio frame, the time subunit may be a symbol, and the frequency unit is a subcarrier. Further, the third time-frequency resource occupies, for example, subcarriers 0 to 3 and subcarriers 8 to 11 on a symbol 0, and subcarriers 4 to 7 on a symbol 1, and these time-frequency resources cannot be used to transmit the first data and the first reference signal. Further, in this example, based on preset settings or regulations, the first three time subunits in the first time unit and the first three time subunits in the second time unit may be used to carry the first reference signal.

Therefore, that in the frequency-domain range, a time-domain start position of the second time-frequency resource is an earliest time subunit in time-domain other than the first time-domain range in the first time-domain resource, or the time-domain start position of the second time-frequency resource is the earliest time subunit that may be used to carry the first reference signal in time domain in the first time-domain resource may be that in the frequency domain range, neither the symbol 0 nor the symbol 1 can be used to carry the first reference signal, in other words, in the frequency domain range, the first time-domain range in which the first time-domain resource and the time-domain resource of the third time-frequency resource overlap the symbol 0 and the symbol 1, or may be understood as that all time-domain range of the third time-frequency resource belongs to the overlapping first time-domain range. Therefore, in the frequency domain range, the time-domain resource that may be used for the first reference signal, that is, the time-domain range of the second time-frequency resource, starts from the symbol 2. Therefore, the symbol 2 is an earliest time subunit in time domain other than the first time-domain range in the first time-domain resource, or the time-domain start position of the second time-frequency resource is an earliest time subunit that may be used to carry the first reference signal in time domain in the first time-domain resource.

Further, the symbol 2 may be the time-domain start position of the second time-frequency resource used to carry the first reference signal. If the first reference signal occupies one symbol, the time-domain range of the second time-frequency resource is the symbol 2. If the first reference signal occupies a plurality of symbols, the second time-frequency resource may occupy, starting from the symbol 2, a plurality of consecutive or inconsecutive symbols that are in the first time-domain range and that do not overlap the time-domain range of the third time-frequency resource. For example, if the first reference signal occupies two symbols, the symbol 2 of the second radio frame may alternatively be used to carry the first reference signal. The symbol 2 of the first radio frame and the symbol 0 of the second radio frame that are used to carry the first reference signal are inconsecutive in time domain. Further optionally, on different subcarriers in the frequency domain range, in a first implementation, the symbol 0 and the symbol 1 in the first radio frame that do not overlap the third time-frequency resource may be used to carry the first data (as shown in FIG. 5B), and the time-domain start position of the time-frequency resource used to carry the first data may be earlier than the time-domain start position of the second time-frequency resource. Alternatively, in another implementation, the first data may be carried in a symbol behind a symbol used to carry the first reference signal, that is, the time-domain start position of the time-frequency resource used to carry the first data is not earlier than the time-domain start position of the second time-frequency resource.

It should be noted that, in this transmission manner, the first reference signal is located on a same symbol, to improve channel estimation performance and reduce design complexity. Further, in the first implementation, in the frequency domain range, the time-domain start position of the time-frequency resource used to carry the first data is earlier than the time-domain start position of the second time-frequency resource. In this way, a resource can be used more effectively, and a resource waste is avoided.

Further optionally, different data and/or reference signals transmitted between the first node and the second node correspond to corresponding priorities. The priority may be preconfigured by the first node, or predefined in a protocol or a standard.

For example, a priority of the second data is higher than a priority of the first data, and is higher than a priority of a reference signal for demodulating the first data.

The priority is set to ensure transmission of high-priority information. In addition, according to a rule in which a resource is configured in a time-domain sequence, scheduling of low-priority information is more flexible and transmission performance of the low-priority information can be ensured.

In the technical solution of this application, the first reference signal may include a reference signal corresponding to one antenna port, or may include a plurality of reference signals corresponding to a plurality of antenna ports. Correspondingly, the first data may include data from the antenna port, or may include a plurality of pieces of data from the plurality of antenna ports. When the first reference signal includes a plurality of reference signals corresponding to a plurality of antenna ports, how to configure and design a resource of a plurality of reference signals in the second time-frequency resource is also a technical problem that needs to be resolved.

In an optional design, the first reference signal includes the plurality of reference signals corresponding to the plurality of antenna ports, and the first data includes the plurality of pieces of data from the plurality of antenna ports. This application sets no further limitation on a resource configuration of the data from the plurality of antenna ports included in the first data.

In an implementation, in the first frequency domain range, at least two of the plurality of reference signals occupy different time subunits in time domain, and/or at least two of the plurality of reference signals occupy different frequency units in frequency domain. In the foregoing implementation, the plurality of reference signals may occupy the second time-frequency resource in a frequency domain range in a time division multiplexing, frequency division multiplexing, or time division combined with frequency division multiplexing manner.

The method may further include step 340 where the first node sends second configuration information to the second node, and where the second configuration information includes multiplexing manner information of the reference signals corresponding to the plurality of antenna ports. Correspondingly, the second node receives the second configuration information, and obtains the multiplexing manner information. In an example, the multiplexing manner information may indicate or include a time division multiplexing manner, a frequency division multiplexing manner, and a time division combined with frequency division multiplexing manner. The following separately provides descriptions.

Figure 6A:
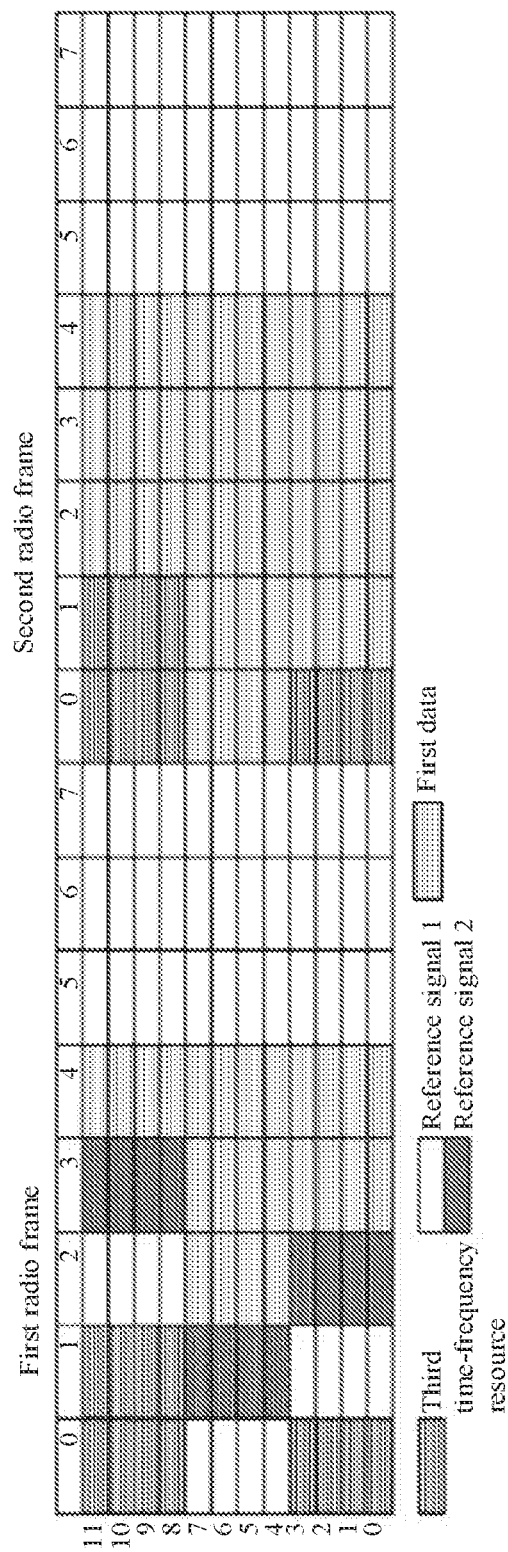
FIG. 6A is a schematic diagram of another possible data transmission manner according to an embodiment of this application.
Figure 6B:
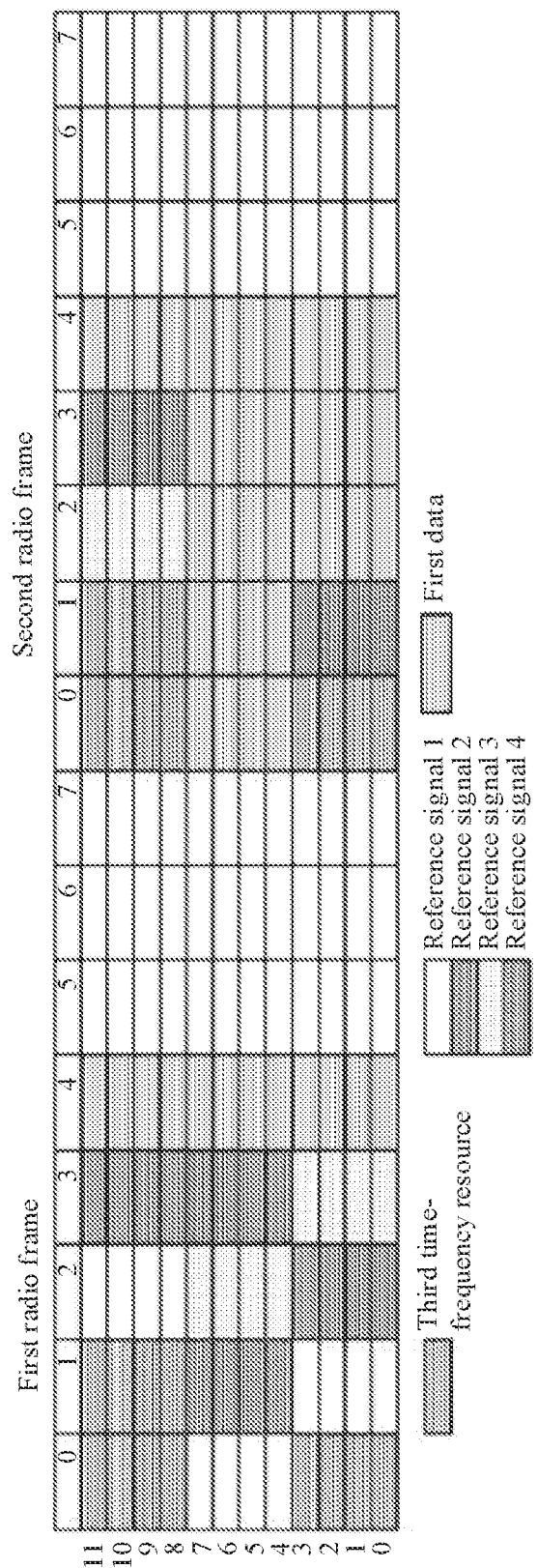
FIG. 6B is a schematic diagram of another possible data transmission manner according to an embodiment of this application.

In a first implementation, in the first frequency domain range, at least two reference signals or all reference signals of the plurality of reference signals occupy different time subunits in time domain, that is, the time division multiplexing manner, as shown in FIG. 6A and FIG. 6B.

In the example transmission manner provided in FIG. 6A, the first reference signal may include a reference signal 1 and a reference signal 2 that correspond to two antenna ports. The first time-domain resource occupies the first five symbols in a first radio frame and the first five symbols in a second radio frame, the first frequency domain resource occupies three consecutive frequency domain ranges, and each frequency domain range occupies four consecutive subcarriers. The symbols occupied by the first time-domain resource may be a part or all of symbols in a radio frame that have a same transmission direction as the first data and the first reference signal.

In an implementation, the first five symbols of the radio frame may be used to carry the first reference signal. It may also be understood as that symbols of the radio frame that are used to carry the first reference signal are not limited, and a symbol with the same transmission direction as the first reference signal can be used to carry the first reference signal.

According to the foregoing descriptions, in the first frequency domain range (subcarriers 0 to 4), the third time-frequency resource occupies the symbol 0, and the time-domain start position of the second time-frequency resource starts from the symbol 1. Further, the reference signal 1 and the reference signal 2 occupy the symbol 1 and the symbol 2 respectively.

Further, to ensure that in the first frequency domain range, the time-domain start position of the time-frequency resource used to carry the first data is not earlier than the time-domain start position of the second time-frequency resource, the first data may be transmitted starting from the symbol 3 of the first radio frame.

According to a same rule, in the second frequency domain range, the third time-frequency resource does not occupy any symbol, and in a third frequency domain range, the third time-frequency resource occupies the symbol 0 and the symbol 1. In this case, in the second frequency domain range, the time-domain start position of the second time-frequency resource starts from the symbol 0. Further, the reference signal 1 and the reference signal 2 occupy the symbol 0 and the symbol 1 respectively. In the third frequency domain range, the time-domain start position of the second time-frequency resource is the symbol 2. Further, the reference signal 1 and the reference signal 2 occupy the symbol 2 and the symbol 3 respectively. That is, the reference signal 1 and the reference signal 2 occupy different time subunits in time domain, and are transmitted in a time division multiplexing manner. Further, in the second frequency domain range, the first data may be transmitted starting from the symbol 2. In the third frequency domain range, the first data may be transmitted starting from the symbol 4.

In the example transmission manner provided in FIG. 6B, the first reference signal may include reference signals 1 to 4 corresponding to four antenna ports. The first time-domain resource occupies the first five symbols in a first radio frame and the first five symbols in a second radio frame, the first frequency domain resource occupies three consecutive frequency domain ranges, and each frequency domain range occupies four consecutive subcarriers.

In another implementation, it is limited, according to a preset setting or rule, only four symbols in a radio frame may be used to carry the first reference signal, for example, the first four symbols of the radio frame in FIG. 6B.

According to the foregoing descriptions, in the first frequency domain range (subcarriers 0 to 4), the third time-frequency resource occupies the symbol 0. The time-domain start position of the second time-frequency resource starts from the symbol 1. Because the first four symbols of the radio frame may be used to carry the first reference signal, further, the reference signals 1 to 3 occupy the symbols 1 to 3 respectively. Because the third time-frequency resource also occupies the symbol 0 of the second radio frame, the reference signal 4 can be carried only in the symbol 1 of the second radio frame.

Further optionally, to ensure that in the first frequency domain range, the time-domain start position of the time-frequency resource used to carry the first data is not earlier than the time-domain start position of the second time-frequency resource, the first data may be transmitted starting from the symbol 4 of the first radio frame.

According to a same rule, in the second frequency domain range, the third time-frequency resource does not occupy any symbol, and in a third frequency domain range, the third time-frequency resource occupies the symbol 0 and the symbol 1. In this case, in the second frequency domain range, the time-domain start position of the second time-frequency resource starts from the symbol 0. Further, the reference signals 1 to 4 occupy the symbols 0 to 3 respectively. In the third frequency domain range, the time-domain start position of the second time-frequency resource is the symbol 2. Limited by the fact that the first four symbols are used for transmission of the first reference signal, the reference signal 1 and the reference signal 2 occupy the symbol 2 and the symbol 3 respectively. Further, the reference signals 3 and 4 need to be carried on the symbols 2 and 3 of the second radio frame. That is, the reference signals 1 to 4 occupy different time subunits in time domain, and are transmitted in a time division multiplexing manner. Further optionally, in the second frequency domain range, the first data may be transmitted starting from the symbol 4. In the third frequency domain range, the first data may be transmitted starting from the symbol 4.

In the transmission manner, a plurality of reference signals corresponding to different antenna ports occupy different time subunits, and are independent of each other in time domain, to improve transmission performance.

It should be noted that a person skilled in the art may understand that FIG. 6 merely provides a possible transmission format as an example. In actual communication transmission, a plurality of different transmission formats may exist according to the technical solutions provided in this application. A transmission format is not limited in this application.

Figure 7:
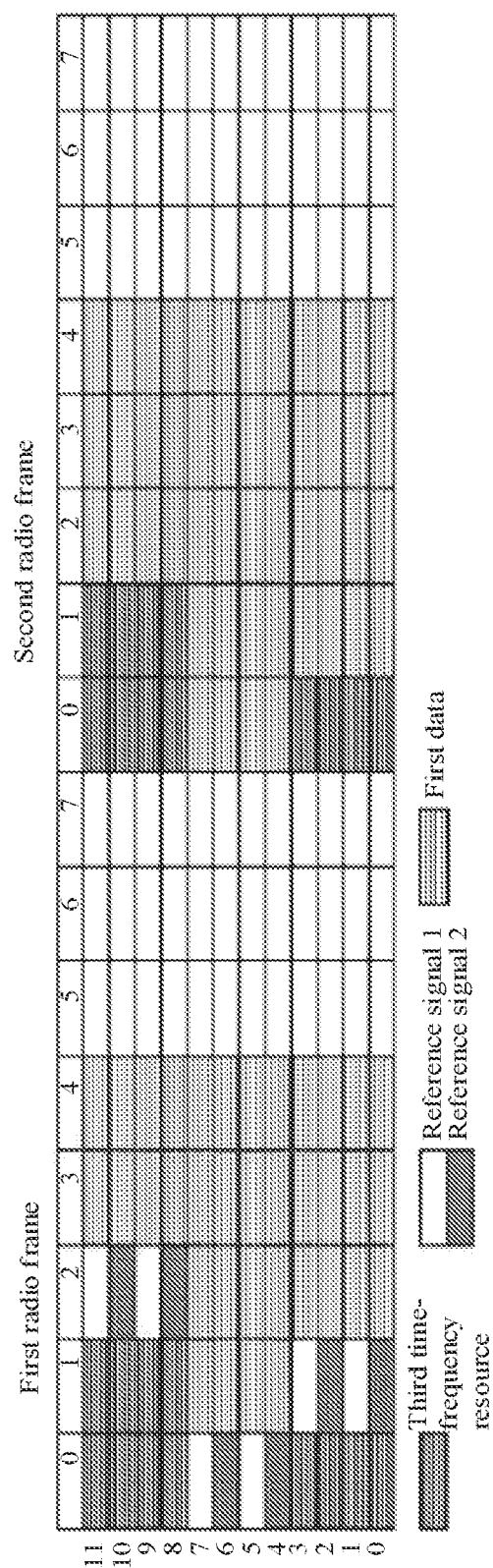
FIG. 7 is a schematic diagram of another possible data transmission manner according to an embodiment of this application.

In a second implementation, in the first frequency domain range, at least two reference signals or all reference signals of the plurality of reference signals occupy different frequency units in frequency domain, that is, the frequency division multiplexing manner, as shown in FIG. 7.

In the example transmission manner provided in FIG. 7, the first reference signal may include a reference signal 1 and a reference signal 2 that correspond to two antenna ports. The first time-domain resource occupies the first five symbols in a first radio frame and the first five symbols in a second radio frame, the first frequency domain resource occupies three consecutive frequency domain ranges, and each frequency domain range occupies four consecutive subcarriers.

In the first frequency domain range (subcarriers 0 to 4), the third time-frequency resource occupies the symbol 0, and according to the foregoing descriptions, the time-domain start position of the second time-frequency resource starts from the symbol 1. Further, the reference signals 1 and 2 may occupy four subcarriers respectively on the symbol 1 in a frequency division manner.

Further optionally, to ensure that in the first frequency domain range, the time-domain start position of the time-frequency resource used to carry the first data is not earlier than the time-domain start position of the second time-frequency resource, the first data may be transmitted starting from the symbol 2 of the first radio frame.

According to a same rule, in the second frequency domain range, the third time-frequency resource does not occupy any symbol, and in a third frequency domain range, the third time-frequency resource occupies the symbol 0 and the symbol 1. In this case, in the second frequency domain range, the time-domain start position of the second time-frequency resource starts from the symbol 0. Further, the reference signals 1 and 2 occupy four subcarriers respectively on the symbol 0 in a frequency division manner. In the third frequency domain range, the time-domain start position of the second time-frequency resource is the symbol 2. Further, the reference signals 1 and 2 occupy four subcarriers respectively on the symbol 2 in a frequency division manner. That is, the reference signal 1 and the reference signal 2 occupy different frequency units in frequency domain, and are transmitted in a frequency division multiplexing manner. Further optionally, in the second frequency domain range, the first data may be transmitted starting from the symbol 1. In the third frequency domain range, the first data may be transmitted starting from the symbol 3.

In the transmission manner, a plurality of reference signals corresponding to different antenna ports occupy different frequency units, and transmission of the plurality of reference signals is completed in a time period as short as possible, to reduce a transmission delay of the first data and improve transmission performance.

It should be noted that a person skilled in the art may understand that FIG. 7 merely provides a possible transmission format as an example. In actual communication transmission, a plurality of different transmission formats may exist according to the technical solutions provided in this application. A transmission format is not limited in this application.

Figure 8:
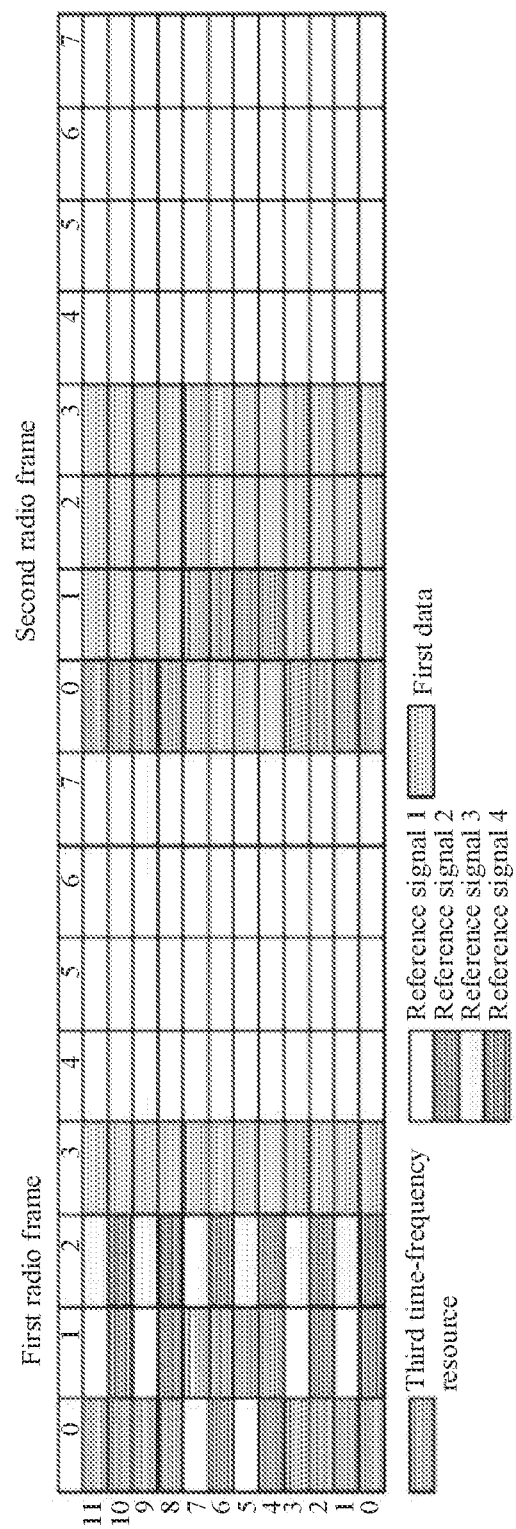
FIG. 8 is a schematic diagram of another possible data transmission manner according to an embodiment of this application.

In a third implementation, in the first frequency domain range, at least two of the plurality of reference signals occupy different time subunits in time domain, and at least two of the plurality of reference signals occupy different frequency units in frequency domain, that is, the time division combined with frequency division multiplexing manner, as shown in FIG. 8.

In the example transmission manner provided in FIG. 8, the first reference signal may include a reference signal 1, a reference signal 2, a reference signal 3, and a reference signal 4 that correspond to four antenna ports. The first time-domain resource occupies the first four symbols in a first radio frame and the first four symbols in a second radio frame, the first frequency domain resource occupies three consecutive frequency domain ranges, and each frequency domain range occupies four consecutive subcarriers.

In the first frequency domain range (subcarriers 0 to 3) and the third time-domain range (subcarriers 8 to 11), the third time-frequency resource occupies the symbol 0, and according to the foregoing descriptions, the time-domain start position of the second time-frequency resource starts from the symbol 1. Further, the reference signals 1 and 2 may occupy the symbol 1, and the reference signals 3 and 4 may occupy the symbol 2, that is, the reference signals 1 and 2 and the reference signals 3 and 4 multiplex the second time-frequency resource in a time division manner. Further, on the symbol 1, the reference signals 1 and 2 may occupy different subcarriers in a frequency division manner, and on the symbol 2, the reference signals 3 and 4 may occupy different subcarriers in a frequency division manner.

Further, to ensure that in the first frequency domain range and the third frequency domain range, the time-domain start position of the time-frequency resource used to carry the first data is not earlier than the time-domain start position of the second time-frequency resource, the first data may be transmitted starting from the symbol 3 of the first radio frame.

According to a same rule, in the second frequency domain range, the third time-frequency resource occupies the symbol 1. According to the foregoing descriptions, the time-domain start position of the second time-frequency resource starts from the symbol 0. Further, the reference signals 1 and 2 may occupy the symbol 0, and the reference signals 3 and 4 may occupy the symbol 2, that is, the reference signals 1 and 2 and the reference signals 3 and 4 multiplex the second time-frequency resource in a time division manner. Further, on the symbol 0, the reference signals 1 and 2 may occupy different subcarriers in a frequency division manner, and on the symbol 2, the reference signals 3 and 4 may occupy different subcarriers in a frequency division manner.

Further, to ensure that in the second frequency domain range, the time-domain start position of the time-frequency resource used to carry the first data is not earlier than the time-domain start position of the second time-frequency resource, the first data may be transmitted starting from the symbol 3 of the first radio frame.

In the transmission manner, a plurality of reference signals corresponding to different antenna ports may be transmitted in the time division combined with frequency division multiplexing manner, to reduce transmission delays of some reference signals, improve transmission resource utilization, and improve transmission performance.

It should be noted that a person skilled in the art may understand that FIG. 8 merely provides a possible transmission format as an example. In actual communication transmission, a plurality of different transmission formats may exist according to the technical solutions provided in this application. A transmission format is not limited in this application.

The foregoing describes the data transmission method 300 provided in embodiments of this application with reference to FIG. 3 to FIG. 8. The following describes, with reference to FIG. 9 to FIG. 11, a data transmission apparatus used to perform the method 300.

It should be noted that the data transmission apparatus may be the first node in the foregoing embodiment of the method 300, and can perform the method implemented by the first node in the foregoing method 300. Alternatively, the data transmission apparatus may be the second node in the foregoing embodiment of the method 300, and can perform the method implemented by the second node in the foregoing method 300. Alternatively, the data transmission apparatus may be an apparatus, such as a chip or an integrated circuit, inside the first node in the foregoing embodiment of the method 300, and can perform the method implemented by the first node in the foregoing method 300. Alternatively, the data transmission apparatus may be an apparatus, such as a chip or an integrated circuit, inside the second node in the foregoing embodiment of the method 300, and can perform the method implemented by the second node in the foregoing method 300.

It may be understood that, to implement the foregoing functions, the data transmission apparatus includes corresponding hardware and/or software modules for performing each function. With reference to algorithm steps of the examples described in embodiments disclosed in this specification, this application can be implemented in a form of hardware or a combination of hardware and computer software. Whether a function is performed by hardware or hardware driven by computer software depends on a particular application and a design constraint of the technical solutions. A person of ordinary skill in the art may use different methods to implement the described functions for each particular application, but it should not be considered that the implementation goes beyond the scope of this application.

In embodiments, functional modules of the data transmission apparatus may be divided according to the foregoing method examples. For example, each functional module may be obtained through division based on each corresponding function, or two or more functions may be integrated into one processing module. The integrated module may be implemented in a form of hardware. It should be noted that, division into the modules in embodiments is an example and is merely logical function division, and may be other division in an actual implementation.

Figure 9:
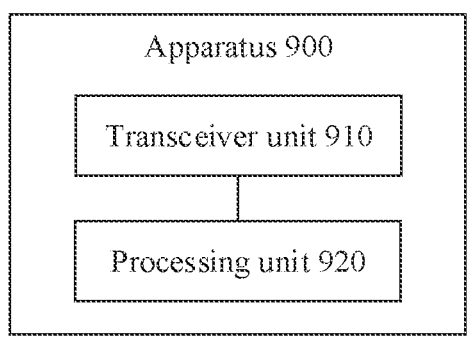
FIG. 9 to FIG. 11 are possible schematic diagrams of data transmission apparatuses according to an embodiment of this application.

When each functional module is obtained through division based on each corresponding function, FIG. 9 is a possible schematic composition diagram of the data transmission apparatus in the foregoing embodiment. As shown in FIG. 9, the apparatus 900 may include a transceiver unit 910 and a processing unit 920. Optionally, the transceiver unit 910 may be a unit integrated with a transceiver function, or may be a receiving unit and a sending unit that independently implement a receiving function and a sending function.

The processing unit 920 may control the transceiver unit 910 to implement the method performed by the first node or the second node in the foregoing embodiment of the method 300, and/or another process used for the technology described in this specification.

It should be noted that, all related content of steps in the foregoing method embodiments may be cited in function descriptions of corresponding functional modules. Details are not described herein again.

In another possible composition, when an integrated unit is used, the apparatus 900 may include a processing unit, a storage unit, and a communication unit. The processing unit may be configured to control and manage an action of the apparatus 900, for example, may be configured to support the apparatus 900 in performing steps performed by the foregoing units. The storage unit may be configured to support the apparatus 900 in executing stored program code, data, and the like. The communication unit may be configured to support communication between the apparatus 900 and another device.

The processing unit may be a processor or a controller. The processing unit may implement or execute logical blocks, modules, and circuits in various examples described with reference to content disclosed in this application. The processor may alternatively be a combination of implementing a computing function, for example, including a combination of one or more microprocessors, or a combination of a digital signal processor (DSP) and a microprocessor. The storage unit may be a memory. The communication unit may be a device that interacts with another electronic device such as a radio frequency circuit, a BLUETOOTH chip, a WIFI chip.

Figure 10:
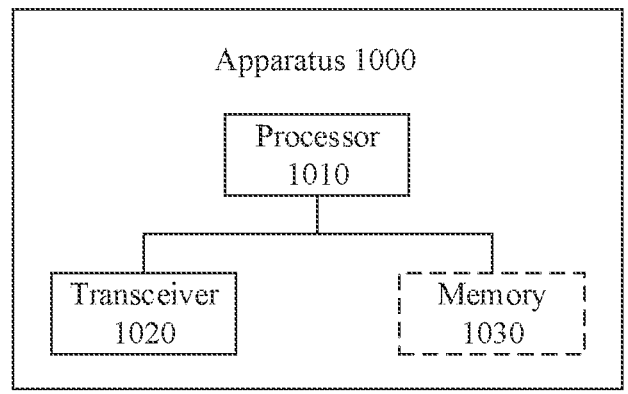

In still another possible composition, the data transmission apparatus in this embodiment may be an apparatus 1000 having a structure shown in FIG. 10. The apparatus 1000 includes a processor 1010 and a transceiver 1020, and the processor 1010 and the transceiver 1020 communicate with each other by using an internal connection path. Related functions implemented by the processing unit 920 in FIG. 9 may be implemented by the processor 1010, and related functions implemented by the transceiver unit 910 may be implemented by the processor 1010 controlling the transceiver 1020.

Optionally, the apparatus 1000 may further include a memory 1030. The processor 1010, the transceiver 1020, and the memory 1030 communicate with each other by using an internal connection path. Related functions implemented by the storage unit in FIG. 9 may be implemented by the memory 1030.

Figure 11:
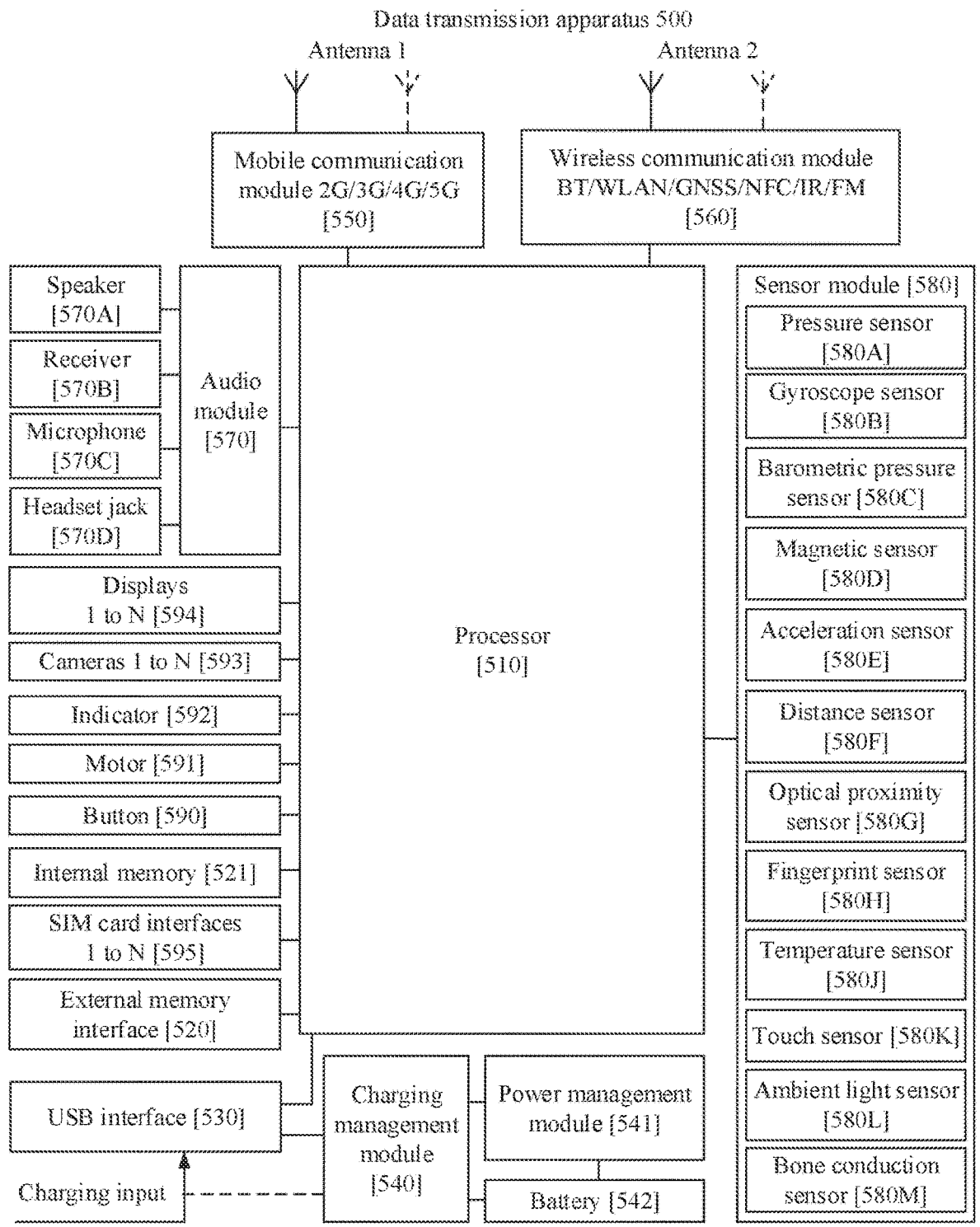

In a possible implementation, FIG. 11 is another schematic block diagram of a data transmission apparatus according to an embodiment of this application. The data transmission apparatus may be the first node in the foregoing embodiment of the method 300, and can perform the method implemented by the first node. Alternatively, the data transmission apparatus may be the second node in the foregoing embodiment of the method 300, and can perform the method implemented by the second node.

As shown in FIG. 11, the data transmission apparatus 500 may include a processor 510, an external memory interface 520, an internal memory 521, a Universal Serial Bus (USB) interface 530, a charging management module 540, a power management module 541, a battery 542, an antenna 1, an antenna 2, a mobile communication module 550, a wireless communication module 560, an audio module 570, a speaker 570A, a receiver 570B, a microphone 570C, a headset jack 570D, a sensor module 580, a button 590, a motor 591, an indicator 592, a camera 593, a display 594, a Subscriber Identification Module (SIM) card interface 595, and the like.

It may be understood that the structure shown in this embodiment of this application does not constitute a specific limitation on the data transmission apparatus 500. In some other embodiments of this application, the data transmission apparatus 500 may include more or fewer components than those shown in the figure, or combine some components, or split some components, or have different component arrangements. The components shown in the figure may be implemented by using hardware, software, or a combination of software and hardware.

The processor 510 may include one or more processing units. For example, the processor 510 may include an application processor (AP), a modem processor, a graphics processing unit (GPU), an image signal processor (ISP), a controller, a video codec, a digital signal processor (DSP), an application-specific integrated circuit (ASIC), a field-programmable gate array (FPGA), a baseband processor, and/or a neural-network processing unit (NPU). Different processing units may be independent components, or may be integrated into one or more processors. In some embodiments, the data transmission apparatus 500 may alternatively include one or more processors 510. The controller may generate an operation control signal based on instruction operation code and a time sequence signal, to complete control of instruction reading and instruction execution. In some other embodiments, the processor 510 may also be provided with a memory, configured to store instructions and data. For example, the memory in the processor 510 may be a cache memory. The memory may store instructions or data just used or cyclically used by the processor 510. If the processor 510 needs to use the instructions or the data again, the processor may directly invoke the instructions or the data from the memory. This avoids repeated access, reduces waiting time of the processor 510, to improve efficiency of the data transmission apparatus 500 processing data or executing instructions.

In some embodiments, the processor 510 may include one or more interfaces. The interfaces may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a SIM card interface, a USB interface, and/or the like. The USB interface 530 is an interface that conforms to a USB standard specification, and may be a mini USB interface, a micro USB interface, a USB Type C interface, or the like. The USB interface 530 may be used to connect a charger to charge the data transmission apparatus 500, or may be used to transmit data between the data transmission apparatus 500 and a peripheral device. The USB interface 530 may also be used to connect a headphone to play audio through the headphone.

It may be understood that the interface connection relationship between modules shown in this embodiment of this application is merely an example for description, and does not constitute a limitation on a structure of the data transmission apparatus 500. In some other embodiments of this application, the data transmission apparatus 500 may alternatively use different interface connection manners or a combination of a plurality of interface connection manners in the foregoing embodiments.

The charging management module 540 is configured to receive a charging input from the charger. The charger may be a wireless charger or a wired charger. In some embodiments of wired charging, the charging management module 540 may receive a charging input from a wired charger through the USB interface 530. In some wireless charging embodiments, the charging management module 540 may receive a wireless charging input through a wireless charging coil of the data transmission apparatus 500. The charging management module 540 may further supply power to the terminal through the power management module 541 when charging the battery 542.

The power management module 541 is configured to connect the battery 542, the charging management module 540, and the processor 510. The power management module 541 receives an input of the battery 542 and/or the charging management module 540, and supplies power to the processor 510, the internal memory 521, an external memory, the display 594, the camera 593, the wireless communication module 560, and the like. The power management module 541 may be configured to monitor parameters such as a battery capacity, a battery cycle count, and a battery state of health (e.g., electric leakage and impedance). In some other embodiments, the power management module 541 may alternatively be disposed in the processor 510. In other embodiments, the power management module 541 and the charging management module 540 may alternatively be disposed in a same device.

A wireless communication function of the data transmission apparatus 500 may be implemented by the antenna 1, the antenna 2, the mobile communication module 550, the wireless communication module 560, the modem processor, the baseband processor, and the like.

The antenna 1 and the antenna 2 are configured to transmit and receive electromagnetic wave signals. Each antenna in the data transmission apparatus 500 may be configured to cover a single communication band or a plurality of communication bands. Different antennas may be further multiplexed, to improve antenna utilization. For example, the antenna 1 may be multiplexed as a diversity antenna in a wireless local area network. In some other embodiments, an antenna may be used in combination with a tuning switch.

The mobile communication module 550 may provide a wireless communication solution including 2G/3G/4G/5G and the like applied to the data transmission apparatus 500. The mobile communication module 550 may include at least one filter, a switch, a power amplifier, a low noise amplifier (LNA), and the like. The mobile communication module 550 may receive an electromagnetic wave through the antenna 1, perform processing such as filtering or amplification on the received electromagnetic wave, and transmit the electromagnetic wave to the modem processor for demodulation. The mobile communication module 550 may further amplify a signal modulated by the modem processor, and convert the signal into an electromagnetic wave for radiation through the antenna 1. In some embodiments, at least some functional modules of the mobile communication module 550 may be disposed in the processor 510. In some embodiments, at least some functional modules of the mobile communication module 550 may be disposed in a same device as at least some modules of the processor 510.

The wireless communication module 560 may provide a wireless communication solution that is applied to the data transmission apparatus 500 and that includes a wireless local area network (WLAN) (for example, a wireless fidelity (WIFI) network), BLUETOOTH (BT), a global navigation satellite system (GNSS), frequency modulation (FM), an NFC technology, an infrared (IR) technology, or the like.

Optionally, the wireless communication module 560 may be one or more components integrated with at least one communication processing module. One communication processing module may correspond to one network interface. The network interface may be disposed in a different service function mode. The network interface disposed in a different mode may establish a network connection corresponding to the mode.

For example, a network connection supporting a P2P function may be established through a network interface in a P2P function mode, a network connection supporting a STA function may be established through a network interface in a STA function mode, and a network connection supporting an AP function may be established through a network interface in an AP mode.

The wireless communication module 560 receives an electromagnetic wave through the antenna 2, performs frequency modulation and filtering processing on an electromagnetic wave signal, and sends a processed signal to the processor 510. The wireless communication module 560 may further receive a to-be-sent signal from the processor 510, perform frequency modulation and amplification on the signal, and convert the signal into an electromagnetic wave for radiation through the antenna 2.

The data transmission apparatus 500 implements a display function through a GPU, a display 594, and an application processor, and the like. The GPU is a microprocessor for image processing, and is connected to the display 594 and the application processor. The GPU is configured to: perform mathematical and geometric calculation, and render an image. The processor 510 may include one or more GPUs that execute program instructions to generate or change display information.

The display 594 is configured to display an image, a video, or the like. The display 594 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the data transmission apparatus 500 may include one or more displays 594.

In some embodiments of this application, when the display panel uses a material such as an OLED, an AMOLED, or a FLED, the display 594 in FIG. 6 may be bent. Herein, that the display 594 may be bent means that the display may be bent to any angle at any part and may be held at this angle. For example, the display 594 may be folded left to right from the middle, or may be fold up and down from the middle. In this application, a display that may be bent is referred to as a foldable display. The touch display may be one screen, or may be a display formed by combining a plurality of screens. This is not limited herein.

The display 594 of the data transmission apparatus 500 may be a flexible screen. The flexible screen currently has attracted attention due to unique features and great potential. Compared with a conventional screen, the flexible screen has features of strong flexibility and bendability, may provide a new interaction manner that is based on a flexibility feature for a user, and may meet more requirements of the user for a terminal. For the data transmission apparatus provided with a foldable display, the foldable display on the data transmission apparatus may be switched between a small screen in a folded form and a large screen in an expanded form at any time. Therefore, the user uses a split-screen function on the data transmission apparatus provided with the foldable display more and more frequently.

The data transmission apparatus 500 may implement a photographing function by using the ISP, the camera 593, the video codec, the GPU, the display 594, the application processor, and the like.

The ISP is configured to process data fed back by the camera 593. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 593.

The camera 593 is configured to capture a static image or a video. An optical image of an object is generated through the lens, and is projected onto the photosensitive element. The photosensitive element may be a charge-coupled device (CCD) or a complementary metal-oxide-semiconductor (CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, RGB or YUV. In some embodiments, the data transmission apparatus 500 may include one or more cameras 593.

The digital signal processor is configured to process a digital signal, and may process another digital signal in addition to the digital image signal. For example, when the data transmission apparatus 500 selects a frequency, the digital signal processor is configured to perform Fourier transform on frequency energy.

The video codec is configured to: compress or decompress a digital video. The data transmission apparatus 500 may support one or more video codecs. Therefore, the data transmission apparatus 500 may play or record videos in a plurality of coding formats, for example, Moving Picture Experts Group (MPEG)-1, MPEG-2, MPEG-3, and MPEG-4.

The NPU is a neural-network (NN) computing processor. The NPU quickly processes input information with reference to a structure of a biological neural network, for example, a transfer mode between human brain neurons, and may further continuously perform self-learning. Applications such as intelligent cognition of the data transmission apparatus 500 may be implemented by using the NPU, for example, image recognition, face recognition, speech recognition, and text understanding.

The external memory interface 520 may be configured to connect to an external memory card, for example, a micro secure digital (MicroSD) card, to extend a storage capability of the data transmission apparatus 500. The external storage card communicates with the processor 510 through the external memory interface 520, to implement a data storage function. For example, files such as music and a video are stored in the external storage card.

The internal memory 521 may be configured to store one or more computer programs, where the one or more computer programs include instructions. The processor 510 may run the foregoing instructions stored in the internal memory 521, so that the data transmission apparatus 500 performs the screen-off display method, various applications, data processing, and the like that are provided in some embodiments of this application. The internal memory 521 may include a program storage area and a data storage area. The program storage area may store an operating system. The program storage area may further store one or more applications (for example, a gallery or a contact). The data storage area may store data (for example, a photo or a contact) created during the use of the data transmission apparatus 500. In addition, the internal memory 521 may include a high-speed random-access memory (RAM), and may further include a nonvolatile memory, for example, at least one magnetic disk storage device, a flash memory, or a universal flash storage (-UFS). In some embodiments, the processor 510 may run the instructions stored in the internal memory 521 and/or the instructions stored in the memory disposed in the processor 510, to enable the data transmission apparatus 500 to perform the screen-off display method, other applications, and data processing provided in embodiments of this application. The data transmission apparatus 500 may implement an audio function such as music play or recording by using the audio module 570, the speaker 570A, the receiver 570B, the microphone 570C, the headset interface 570D, the application processor, and the like.

The sensor module 580 may include a pressure sensor 580A, a gyroscope sensor 580B, a barometric pressure sensor 580C, a magnetic sensor 580D, an acceleration sensor 580E, a distance sensor 580F, an optical proximity sensor 580G, a fingerprint sensor 580H, a temperature sensor 580J, a touch sensor 580K, an ambient light sensor 580L, a bone conduction sensor 580M, and the like.

This embodiment further provides a non-transitory computer storage medium. The computer storage medium stores computer instructions. When the computer instructions are run on a computer, the method implemented by the first node or the second node in any one of the foregoing embodiments can be implemented.

This embodiment further provides a computer program product. When the computer program product runs on a computer, the computer is enabled to perform the foregoing related steps, to implement the method implemented by the first node or the second node in any one of the foregoing embodiments.

An embodiment of this application further provides an apparatus. The apparatus may be a chip, an integrated circuit, a component, or a module. In an example, the apparatus may include a connected processor and a memory configured to store instructions, or the apparatus includes at least one processor, configured to obtain instructions from an external memory. When the apparatus runs, the processor may execute the instructions, so that the chip performs the data transmission method in the foregoing method embodiments.

Figure 12:
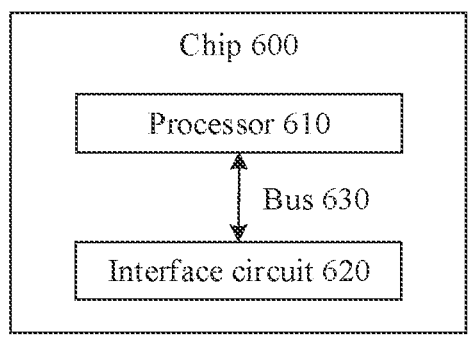
FIG. 12 is a schematic diagram of a chip according to an embodiment of this application.

FIG. 12 is a schematic diagram of a structure of a chip 600. The chip 600 includes one or more processors 610 and an interface circuit 620. Optionally, the chip 600 may further include a bus 630.

The processor 610 may be an integrated circuit chip and has a signal processing capability. In an implementation process, the steps in the foregoing method may be implemented by using a hardware integrated logical circuit in the processor 610, or by using instructions in a form of software.

The processor 610 may be a general-purpose processor, a DSP, an ASIC, an FPGA or another programmable logic device, a discrete gate or transistor logic device, or a discrete hardware component. The processor may implement or execute the methods and steps disclosed in embodiments of this application. The general-purpose processor may be a microprocessor, or the processor may be any conventional processor or the like.

The interface circuit 620 may be configured to send or receive data, instructions, or information. The processor 610 may perform processing by using the data, the instructions, or other information received by the interface circuit 620, and may send processed information through the interface circuit 620.

Optionally, the chip further includes a memory. The memory may include a read-only memory and a RAM, and provides operation instructions and data for the processor. A part of the memory may further include a non-volatile RAM (NVRAM).

Optionally, the memory stores an executable software module or a data structure, and the processor may perform a corresponding operation by invoking the operation instructions (where the operation instructions may be stored in an operating system) stored in the memory.

Optionally, the chip may be used in the first control apparatus, the second control apparatus, or the terminal device in embodiments of this application. Optionally, the interface circuit 620 may be configured to output an execution result of the processor 610. For the data transmission method provided in one or more embodiments of this application, refer to the foregoing embodiments. Details are not described herein again.

It should be noted that functions corresponding to the processor 610 and the interface circuit 620 may be implemented by using a hardware design, may be implemented by using a software design, or may be implemented by using a combination of software and hardware. This is not limited herein.

An embodiment of this application further provides a terminal. The terminal may be a transport vehicle or an intelligent device, and the transport vehicle or the intelligent device includes at least one of the apparatus 900 in FIG. 9, the apparatus 1000 in FIG. 10, or the apparatus 500 in FIG. 11. For example, the terminal may be a smart home device, an intelligent wearable device, an uncrewed or unmanned aerial vehicle, an unmanned transport vehicle, an automobile, a robot, or the like.

The data transmission apparatus, the computer storage medium, the computer program product, the chip, or the terminal provided in embodiments is configured to perform the corresponding method provided above. Therefore, for beneficial effects that can be achieved by the data transmission apparatus, the computer storage medium, the computer program product, the chip, or the terminal, refer to beneficial effects in the corresponding method provided above. Details are not described herein again.

It should be understood that sequence numbers of the foregoing processes do not mean execution sequences in embodiments of this application. The execution sequences of the processes should be determined based on functions and internal logic of the processes, and should not constitute any limitation on implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application. It may be clearly understood by a person skilled in the art that, for the purpose of convenient and brief description, for a detailed working process of the foregoing system, apparatus, and unit, refer to a corresponding process in the foregoing method embodiments, and details are not described herein again.

In several embodiments provided in this application, it should be understood that the disclosed system, apparatus, and method may be implemented in another manner. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The storage medium includes: any medium that can store program code, such as a USB flash drive, a removable hard disk, a read-only memory (ROM), a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, comprising:
   receiving first configuration information from a first node, wherein the first configuration information indicates at least one of a first time-domain resource or a first frequency-domain resource, wherein at least one of the first time-domain resource or the first frequency-domain resource is for carrying first data and a first reference signal, and wherein the first reference signal is a demodulation reference signal of the first data; and
   transmitting the first reference signal on a second time-frequency resource,
   wherein the second time-frequency resource does not overlap a third time-frequency resource,
   wherein the third time-frequency resource is for carrying at least one of second data or a control-type signal, and
   wherein in a first frequency-domain range:
   a first time-domain start position of the second time-frequency resource is an earliest time subunit in a second time-domain resource that is other than a first time-domain range in the first time-domain resource; and
   a second time domain resource of the third time-frequency resource overlaps the first time-domain resource.

2. The data transmission method of claim 1, wherein a second time-domain start position of the second time-frequency resource is an earliest time subunit in a second time-domain resource that is in the first time-domain resource and that is for carrying the first reference signal.

3. The data transmission method of claim 1, wherein a second time-domain start position of the second time-frequency resource in the first frequency-domain range is different from the first time-domain start position in a second frequency-domain range.

4. The data transmission method of claim 3, wherein the first frequency-domain range comprises N consecutive frequency units in a frequency domain or the second frequency-domain range comprises M consecutive frequency units in the frequency domain, and wherein N and M are positive integers.

5. The data transmission method of claim 1, wherein a second time-domain start position of a time-frequency resource that is for carrying the first data in the first frequency-domain range is not earlier than the first time-domain start position of the second time-frequency resource in the first frequency-domain range.

6. The data transmission method of claim 1, wherein in a first frequency-domain range, a plurality of time subunits comprised in the second time-frequency resource is either consecutive or inconsecutive in a time domain.

7. The data transmission method of claim 1, wherein the first reference signal comprises a plurality of reference signals corresponding to a plurality of antenna ports, wherein the first data is from the antenna ports, and wherein at least two of the reference signals occupy at least one of different time subunits in a time domain or different frequency units in a frequency domain.

8. The data transmission method of claim 7, further comprising receiving second configuration information, wherein the second configuration information comprises multiplexing manner information of the reference signals.

9. The data transmission method of claim 1, wherein the first time-domain resource comprises a time subunit of one or more first time units, and wherein the one or more first time units comprises at least one first time subunit, a first guard period (GP), at least one second time subunit, and a second guard period that are consecutive in a time domain.

10. A data transmission method, comprising:
    sending first configuration information to a second node, wherein the first configuration information indicates at least one of a first time-domain resource or a first frequency-domain resource, wherein at least one of the first time-domain resource or the first frequency-domain resource carries first data and a first reference signal, and wherein the first reference signal is a demodulation reference signal of the first data; and
    receiving the first reference signal on a second time-frequency resource,
    wherein the second time-frequency resource does not overlap a third time-frequency resource,
    wherein the third time-frequency resource is for carrying at least one of second data or a control-type signal, and
    wherein in a first frequency-domain range:
    a first time-domain start position of the second time-frequency resource is an earliest time subunit in a second time-domain resource that is other than a first time-domain range in the first time-domain resource; and
    a second time-domain resource of the third time-frequency resource overlaps the first time-domain resource.

11. The data transmission method of claim 10, wherein a second time-domain start position of the second time-frequency resource is an earliest time subunit in a second time-domain resource that is in the first time-domain resource and that is for carrying the first reference signal.

12. The data transmission method of claim 10, wherein a second time-domain start position of the second time-frequency resource in the first frequency-domain range is different from the first time-domain start position in a second frequency-domain range.

13. The data transmission method of claim 12, wherein the first frequency-domain range comprises N consecutive frequency units in a frequency domain or the second frequency-domain range comprises M consecutive frequency units in the frequency domain, and wherein N and M are positive integers.

14. The data transmission method of claim 10, wherein a second time-domain start position of a time-frequency resource that is for carrying the first data in the first frequency domain range is not earlier than the first time-domain start position of the second time-frequency resource in the first frequency-domain range.

15. The data transmission method of claim 10, wherein in a first frequency-domain range, a plurality of time subunits comprised in the second time-frequency resource is either consecutive or inconsecutive in a time domain.

16. The data transmission method of claim 10, wherein the first reference signal comprises a plurality of reference signals corresponding to a plurality of antenna ports, wherein the first data is from the antenna ports, and wherein at least two of the reference signals occupy at least one of different time subunits in a time domain or different frequency units in a frequency domain.

17. The data transmission method of claim 16, further comprising sending second configuration information, wherein the second configuration information comprises multiplexing manner information of the reference signals.

18. An apparatus, comprising:
- a non-transitory storage medium configured to store program instructions; and
- a processor coupled to the non-transitory storage medium and configured to execute the program instructions that cause the apparatus to:
  - receive first configuration information from a first node, the first configuration information indicates at least one of a first time-domain resource or a first frequency-domain resource, wherein at least one of the first time-domain resource or the first frequency-domain resource is for carrying first data and a first reference signal, and wherein the first reference signal is a demodulation reference signal of the first data; and
  - transmit the first reference signal on a second time-frequency resource,
  - wherein the second time-frequency resource does not overlap a third time-frequency resource,
  - wherein the third time-frequency resource is for carrying at least one of second data or a control-type signal, and
  - wherein in a first frequency-domain range:
    - a first time-domain start position of the second time-frequency resource is an earliest time subunit in a second time-domain resource that is other than a first time-domain range in the first time-domain resource; and
    - a second time domain resource of the third time-frequency resource overlaps the first time-domain resource.

19. The apparatus of claim 18, wherein a second time-domain start position of the second time-frequency resource is an earliest time subunit in a second time-domain resource that is in the first time-domain resource and that is for carrying the first reference signal.

20. The apparatus of claim 18, wherein a second time-domain start position of the second time-frequency resource in the first frequency-domain range is different from the first time-domain start position in a second frequency-domain range.

* * * * *